United States Patent
Xiao et al.

(10) Patent No.: US 11,763,150 B2
(45) Date of Patent: Sep. 19, 2023

(54) METHOD AND SYSTEM FOR BALANCED-WEIGHT SPARSE CONVOLUTION PROCESSING

(71) Applicant: MOFFETT INTERNATIONAL CO., LIMITED

(72) Inventors: Zhibin Xiao, Los Altos, CA (US); Enxu Yan, Los Altos, CA (US); Wei Wang, Los Altos, CA (US); Yong Lu, Los Altos, CA (US)

(73) Assignee: Moffett International Co., Limited, Hong Kong (HK)

( * ) Notice: Subject to any disclaimer, the term of this patent is extended or adjusted under 35 U.S.C. 154(b) by 0 days.

(21) Appl. No.: 17/391,432

(22) Filed: Aug. 2, 2021

(65) Prior Publication Data

US 2021/0406686 A1  Dec. 30, 2021

Related U.S. Application Data

(63) Continuation of application No. 16/917,256, filed on Jun. 30, 2020, now Pat. No. 11,113,601.

(51) Int. Cl.
*G06N 3/08* (2023.01)
*G06N 3/04* (2023.01)

(52) U.S. Cl.
CPC ............ *G06N 3/08* (2013.01); *G06N 3/04* (2013.01)

(58) Field of Classification Search
CPC .................................... G06N 3/08; G06N 3/04
See application file for complete search history.

(56) References Cited

U.S. PATENT DOCUMENTS

2018/0322607 A1  11/2018  Mellempudi et al.
2019/0108436 A1*  4/2019  David .................... G06N 3/105
(Continued)

FOREIGN PATENT DOCUMENTS

| CN | 111062472 A | 4/2020 |
| TW | 201921263 A | 6/2019 |

OTHER PUBLICATIONS

Zhu et al. ("Sparse Tensor Core: Algorithm and Hardware Co-Design for Vector-wise Sparse Neural Networks on Modern GPUs", MICRO-52, Oct. 12-16, 2019, Association for Computing Machinery) (Year: 2019).*

(Continued)

*Primary Examiner* — Michael J Huntley
*Assistant Examiner* — Imad Kassim
(74) *Attorney, Agent, or Firm* — Sheppard Mullin Richter & Hampton LLP

(57) ABSTRACT

Methods, systems, and apparatus, including computer programs encoded on computer storage media, for balanced-weight sparse convolution processing. An exemplary method comprises: obtaining an input tensor and a plurality of filters at a layer within a neural network; segmenting the input tensor into a plurality of sub-tensors; dividing a channel dimension of each of the plurality of filters into a plurality of channel groups; pruning each of the plurality of filters so that each of the plurality of channel groups of each filter comprises a same number of non-zero weights; segmenting each of the plurality of filters into a plurality of the sub-filters according to the plurality of channel groups; and assigning the plurality of sub-tensors and the plurality of sub-filters to a plurality of processors for parallel convolution processing.

17 Claims, 11 Drawing Sheets

(56) References Cited

U.S. PATENT DOCUMENTS

| | | | |
|---|---|---|---|
| 2019/0266218 A1 | 8/2019 | Scott et al. | |
| 2019/0332925 A1* | 10/2019 | Modha | G06N 3/04 |
| 2019/0347536 A1 | 11/2019 | David et al. | |
| 2019/0347554 A1 | 11/2019 | Choi et al. | |
| 2019/0392323 A1 | 12/2019 | Yan et al. | |
| 2020/0160181 A1 | 5/2020 | Zlateski et al. | |
| 2020/0401895 A1* | 12/2020 | Litvak | G06N 3/082 |

OTHER PUBLICATIONS

Park et al. ("Faster CNNS With Direct Sparse Convolutions and Guided Pruning", Jul. 28, 2017) (Year: 2017).*

Gondimalla et al. ("SparTen: A Sparse Tensor Accelerator for Convolutional Neural Networks", MICRO'19, Oct. 12-16, 2019) (Year: 2019).*

Parashar et al. "SCNN: An Accelerator for Compressed-Sparse Convolutional Neural Networks", May 2017, Association for Computing Machinery, vol. 45 (Year: 2017).*

Liu et al. ("Sparse Convolutional Neural Networks", Jun. 2015, IEEE ) (Year: 2015).*

Mostafa et al. ("Parameter Efficient Training of Deep Convolutional Neural Networks by Dynamic Sparse Reparameterization", 2019) (Year: 2019).*

Sattaret et al. ("Data Parallel Large Sparse Deep Neural Network on GPU", 2020 IEEE) (Year: 2020).*

Liu et al. ("Sparse Convolutional Neural Networks", IEEE (CVPR), 2015, pp. 806-814) (Year: 2015).*

Elsen et al., "Fast Sparse ConvNets", arVix 1911.09723, Nov. 2019, 12 pages.

Gale et al., "The State of Sparsity in Deep Neural Networks", arVix 1902.09574, Feb. 2019, 15 pages.

Parashar et al., "SCNN: An Accelerator for Compressed-sparse Convolution Neural Networks", arVix 1708.04485, May 2017, 12 pages.

Park et al., "Faster CNNs with Direct Sparse Convolutions and Guided Pruning", International Conference on Learning Representation 2017, 12 pages.

Zhu et al., "Sparse Tensor Core: Algorithm and Hardware Co-Design for Vector-wise Sparse Neural Networks on Modern GPUs", Association for Computing Machinery, Oct. 2019, Micro-52, pp. 359-371.

International Search Report and Written Opinion for PCT Application No. PCT/CN2021/103746, dated Sep. 28, 2021, 9 pages.

Search Report dated Aug. 1, 2023, issued in related Taiwan Application No. 111115017 (2 pages).

* cited by examiner

METHOD AND SYSTEM FOR BALANCED-WEIGHT SPARSE CONVOLUTION PROCESSING

CROSS REFERENCE TO RELATED APPLICATION

This application is a continuation of U.S. patent application Ser. No. 16/917,256, filed on Jun. 30, 2020, the contents of which are hereby incorporated by reference in their entirety.

TECHNICAL FIELD

The disclosure relates generally to artificial intelligence, more particularly to balanced-weight sparse convolution processing.

BACKGROUND

Neural networks (NN) are currently the foundation for many modern artificial intelligence (AI) applications such as image and video recognition, recommender systems, classification, medical image analysis, and natural language processing. NNs are employed in various usage scenarios from self-driving cars, detecting cancer, to playing complex games. A typical NN may comprise a series of convolution layers where expensive (computational and energy-wise) convolution operations are performed.

In recent years, various technologies have been developed to improve the computational efficiency of NNs by introducing sparseness to the convolution processing in NNs, such as pruning the filters to reduce the number of non-zero weights. However, existing hardware architectures rely on general-purpose compute engines (e.g., GPUs), which are not optimized for convolution involving filters with sparse weights (e.g., limited numbers of non-zero weights). These architectures are unable to efficiently store the sparse filters in memory, or fully exploit the sparseness to reach higher levels of parallelism at a large scale. Accordingly, it is desirable to build a novel system architecture for efficient sparse convolution.

SUMMARY

Various embodiments of the present specification may include systems, methods, and non-transitory computer-readable media for balanced-weight sparse convolution processing and parallelization.

According to one aspect, the method for balanced-weight sparse convolution processing and parallelization is provided. The method comprises: obtaining an input tensor and a plurality of filters, wherein the input tensor and the plurality of filters have a same number of channels; segmenting the input tensor into a plurality of sub-tensors according to a number of available processors; segmenting each of the plurality of filters into one or more sub-filters to obtain a plurality of the sub-filters, wherein the plurality of the sub-filters each comprises a same number of non-zero weights; respectively assigning the plurality of sub-tensors and the plurality of sub-filters to the available processors, wherein each of the plurality of sub-filters is represented by a compact memory layout storing the non-zero weights of the sub-filter as index-value pairs; for each of the available processors, iterating each of the index-value pairs in the compact memory layout of the assigned plurality of sub-filters and identifying, based on the index-value pair, a corresponding input value in the assigned sub-tensor to perform a multiply-and-accumulate (MAC) operation to generate a partial sum; reassigning the plurality of sub-filters to the available processors by rotating the plurality of sub-filters among the plurality of processors; and accumulating a plurality of the partial sums generated from each of the plurality of processors to obtain an output tensor.

In some embodiments, each of the plurality of sub-tensors comprises the same number of channels as the input tensor.

In some embodiments, the method further comprises: pruning each of the plurality of filters so that every a predetermined number of channels of the filter comprise the same number of non-zero values.

In some embodiments, each of the index-value pairs comprises a channel-dimension index, a width-dimension index, and a corresponding non-zero weight.

In some embodiments, the identifying a corresponding input value in the assigned sub-tensor based on the index-value pair to perform a MAC operation to generate a partial sum comprises: identifying an input value in the assigned sub-tensor based on the channel dimension index and the width-dimension index in the index-value pair; performing a multiplication operation based on the identified input value and the corresponding non-zero weight in the index-value pair to obtain a dot product; and accumulating the dot product with a corresponding partial sum to obtained a new partial sum.

In some embodiments, each of the plurality of filters comprises a channel dimension, a height dimension, and a width dimension, and the segmenting each of the plurality of filters into one or more sub-filters comprises: dividing the channel dimension into a plurality of channel groups; and segmenting, according to the plurality of channel groups, the filter into a plurality of sub-filters with each corresponding to one of the plurality of channel groups.

In some embodiments, the segmenting the filter into a plurality of sub-filters according to the channel groups comprises: segmenting the filter into a plurality of chunks according to the plurality of channel groups; and segmenting each of the plurality of chunks along the height dimension to obtain the plurality of sub-filters, wherein each of plurality of sub-filters shares the width dimension with the filter.

In some embodiments, a subset of the plurality of sub-tensors from a same horizontal plane of the input tensor are respectively assigned to a subset of the available processors, and the assigning the plurality of sub-filters to the available processors comprises: identifying a subset of the plurality of sub-filters that are from a same filter but correspond to different channel groups; and respectively assigning the subset of the plurality of sub-filters to the subset of the available processors.

In some embodiments, the rotating the plurality of sub-filters among the plurality of processors comprises: reassigning the plurality of sub-filters to the available processors by rotating a sub-filter that was assigned to an i-th processor to an (i+1)-th processor.

In some embodiments, the partial sum generated by performing the MAC operation is stored in an accumulation buffer of the processor that is accessible by neighboring processors.

In some embodiments, the accumulating the plurality of the partial sums generated from each of the plurality of processors to obtain an output tensor comprises: during a current convolution layer of a neural network, accumulating the plurality of the partial sums generated from each of the plurality of processors to obtain an activation sub-tensor; in response to the current layer not being a last convolution layer, storing the activation sub-tensor in the processor for a next convolution layer of the neural network; and in response to the current being the last convolution layer, aggregating a plurality of the activation sub-tensors from the available processors to obtain the output tensor.

According to another aspect, a system for balanced-weight sparse convolution processing and parallelization is provided. The system may comprise one or more processors and one or more non-transitory computer-readable memories coupled to the one or more processors and configured with instructions executable by the one or more processors to cause the system to perform operations comprising: obtaining an input tensor and a plurality of filters, wherein the input tensor and the plurality of filters have a same number of channels; segmenting the input tensor into a plurality of sub-tensors according to a number of available processors; segmenting each of the plurality of filters into one or more sub-filters to obtain a plurality of the sub-filters, wherein the plurality of the sub-filters each comprises a same number of non-zero weights; respectively assigning the plurality of sub-tensors and the plurality of sub-filters to the available processors, wherein each of the plurality of sub-filters is represented by a compact memory layout storing the non-zero weights of the sub-filter as index-value pairs; for each of the available processors, iterating each of the index-value pairs in the compact memory layout of the assigned plurality of sub-filters and identifying, based on the index-value pair, a corresponding input value in the assigned sub-tensor to perform a multiply-and-accumulate (MAC) operation to generate a partial sum; reassigning the plurality of sub-filters to the available processors by rotating the plurality of sub-filters among the plurality of processors; and accumulating a plurality of the partial sums generated from each of the plurality of processors to obtain an output tensor.

According to yet another aspect, a non-transitory computer-readable storage medium for balanced-weight sparse convolution processing and parallelization is provided. The medium may be configured with instructions executable by one or more processors to cause the one or more processors to perform operations comprising: obtaining an input tensor and a plurality of filters, wherein the input tensor and the plurality of filters have a same number of channels; segmenting the input tensor into a plurality of sub-tensors according to a number of available processors; segmenting each of the plurality of filters into one or more sub-filters to obtain a plurality of the sub-filters, wherein the plurality of the sub-filters each comprises a same number of non-zero weights; respectively assigning the plurality of sub-tensors and the plurality of sub-filters to the available processors, wherein each of the plurality of sub-filters is represented by a compact memory layout storing the non-zero weights of the sub-filter as index-value pairs; for each of the available processors, iterating each of the index-value pairs in the compact memory layout of the assigned plurality of sub-filters and identifying, based on the index-value pair, a corresponding input value in the assigned sub-tensor to perform a multiply-and-accumulate (MAC) operation to generate a partial sum; reassigning the plurality of sub-filters to the available processors by rotating the plurality of sub-filters among the plurality of processors; and accumulating a plurality of the partial sums generated from each of the plurality of processors to obtain an output tensor.

These and other features of the systems, methods, and non-transitory computer-readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
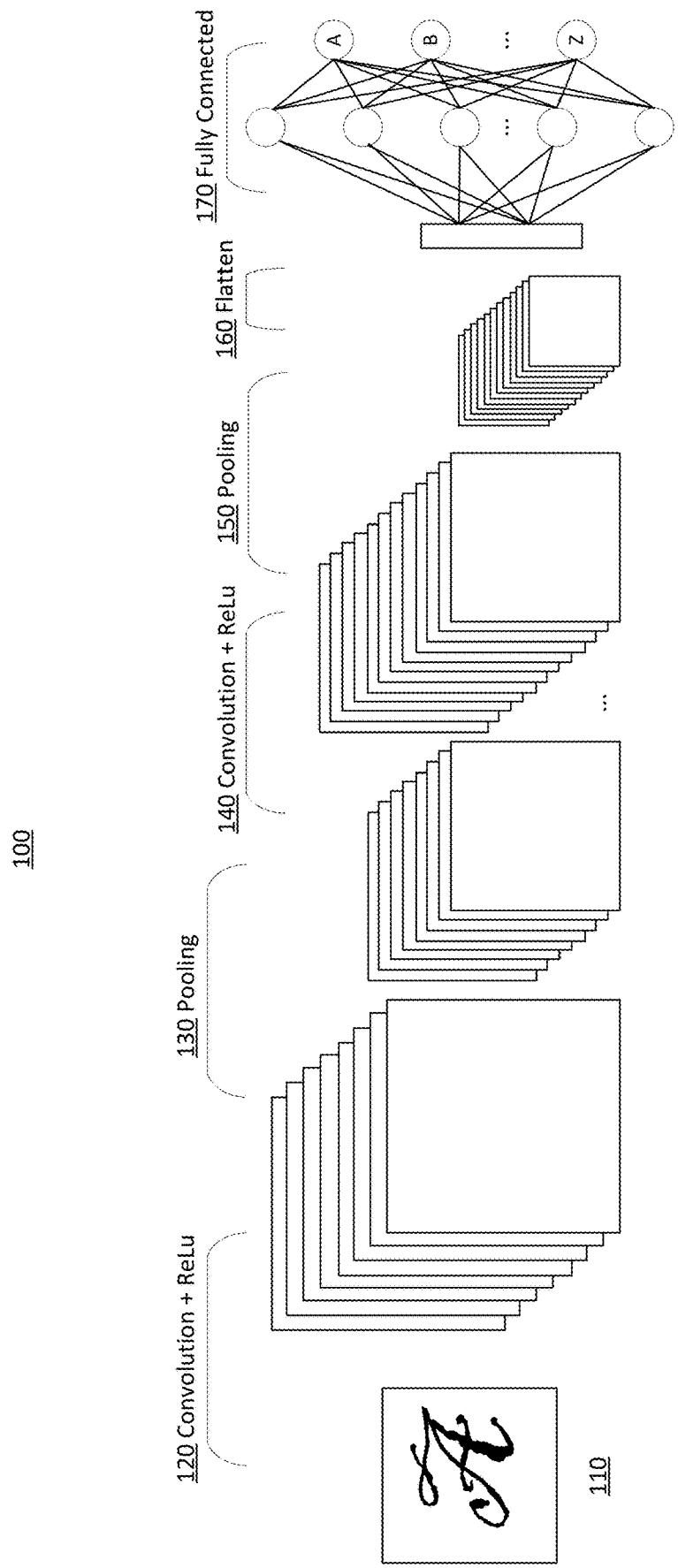
FIG. 1 illustrates an exemplary convolutional neural network (CNN) in accordance with various embodiments.

Embodiments described herein provide methods, systems, apparatus for balanced-weight sparse convolution process in neural networks. A convolution process may refer to a fundamental but computationally expensive operation to extract features of input data from a previous layer, such as a feature map derived from an image or an audio wave, or activations output from a previous layer in a neural network. The input data to a convolution process may be referred to as an input tensor, and the output of the convolution process may be referred to as an output tensor. The input tensor may comprise multiple channels of feature maps. For example, an RGB image may be represented as an input tensor with three channels (red channel, green channel, and blue channel), with each channel comprising a feature map (e.g., a grayscale image of the same size as the original RGB image but made of just one of the red, green, or blue colors). To extract features from an input tensor, one or more feature extractors (also called filters) may be applied to the input tensor in a convolving (e.g., sliding or moving) manner. Multiplication and accumulation (MAC) operations between the feature detectors (filters) and the input tensor may be performed during each convolving step. The outputs generated from the convolving steps may be subsequently assembled to form an output tensor of the convolution process. The output tensor may become the input tensor of the next layer in the neural network. In some cases, multiple input tensors may be involved in a convolution layer.

During a convolution process, the filters may be pruned or sparsified by introducing a large number of zeros to reduce the computation cost and improve inferencing speed. For example, more than 20% or 50% of the values in the filters may be set to zeros. Some embodiments in this specification take advantage of the filter sparseness by efficiently storing the sparsified filters in a memory-efficient layout and parallelizing the convolution processing on a plurality of processing entities (PE) (e.g., processors).

In some embodiments, the input tensor may be first segmented into a plurality of sub-tensors according to the number of PEs that are available to participate in the convolution processing. Each of the sub-tensors may be assigned to one of the plurality of PEs and stay therein throughout multiple iterations of convolution process (corresponding to multiple convolution layers in a NN) without swapping out of the PE's local memory/buffer. After each iteration of convolution process, the sub-tensor assigned to the PE as an input may be updated and evolved into an output, which may be used as the input for the next iteration of convolution process. In some embodiments, the updated sub-tensor may be swapped out of the PE temporarily for memory management purposes, and swapped back in for the next iteration.

In some embodiments, each of the sparse filters may be segmented into a plurality of sub-filters that may be stored in a memory-efficient layout. For example, after being pruned and segmented, each of the sparse filters may be segmented in a way where each of the sub-filters comprises a same number of non-zero weights. Since the non-zero weights are evenly distributed into the plurality of sub-filters, the convolution processing using these sub-filters may be referred to as a balanced-weight sparse convolution. In some embodiments, the non-zero weights within each sub-filter may be stored as index-value pairs, which may then be combined and stored as a fixed number of bits or bytes within the memory to represent the sub-filter. The index-value pair representations of the sub-filters may significantly reduce the memory footprint of a neural network and make the solution suitable for devices with limited memory resources. For example, the embodiments disclosed herein may be applied to edge devices in edge computing systems. In some embodiments, the sub-filters may be assigned to the plurality of PEs that each has an assigned sub-tensor to perform local convolution operations. The assignment guarantees that the pairs of sub-tensor and sub-filter assigned to different PEs are independent from each other so that the plurality of PEs may execute the local operations in parallel to boost performance.

The above described segmentation and parallel processing scheme is also highly scalable. In some embodiments, each round (also called iteration) of the parallel processing may generate a plurality of partial sums, and the plurality of PEs may perform the parallel processing for multiple rounds to accumulate the partial sums generated in each round and assemble the accumulated results as an output tensor. In some embodiments, the partial sums generated by each PE across the multiple rounds may be directly accumulated (within each PE) to generate a portion of the output tensor without the need to exchange data with other PEs.

In some embodiments, the assignment of sub-filters may adopt a weight-rotating mechanism that rotates the sub-filter assignments among the PEs after each round of parallel processing. Here, the "weight" refers to the non-zero values stored in each sub-filter. The benefit provided by this mechanism is at least threefold: avoiding storing a same sub-filter in multiple PE simultaneously (e.g., avoiding copying the same data multiple times); parallelizing and reducing the number of expensive memory reads from a higher-level memory (usually larger in capacity but slower in speed) to obtain weights from a global buffer shared by all PEs; and allowing to utilizing faster directly-connected channels among neighboring PEs to perform the rotation of the sub-filters between every two rounds of parallel processing.

In the following description, specific, non-limiting embodiments of the present invention will be described with reference to the drawings. Particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope, and contemplation of the present invention as further defined in the appended claims.

FIG. 1 illustrates an exemplary convolutional neural network (CNN) in accordance with various embodiments. CNN is widely used in a variety of applications including image understanding, speech recognition, gameplay, robotics, and may employ a deep hierarchy of layers including convolutional layers, where convolution operations occur. It may be noted that CNN is only used for illustrative purposes, the embodiments disclosed herein may be applied to other neural networks that involve convolution operations.

The example neural network 100 illustrated in FIG. 1 comprises a plurality of layers such as a first convolution layer 120 and a first ReLU (Rectified Linear Unit) layer, a first pooling layer 130, a second convolution layer 140 and a second ReLU layer, a second pooling layer 150, a flattening layer 160, and a fully connected (FC) layer 170. This example neural network 100 may be trained to match an alphabet in a given image with a plurality of known alphabet classes. As shown in FIG. 1, an image 110 with a letter is fed into the neural network 100 and transformed through the plurality of layers. The last layer (the FC layer 170) eventually generates a plurality of scores representing the similarity between the letter in the input image 110 and each of the known alphabet classes.

In some embodiments, the input image 110 may be first transformed into an input tensor. As an example, if the input image 110 contains 32*32 pixels and each pixel has three color channels (Red, Green, Blue), its corresponding input tensor may have a size of 32*32*3, with a height as 32, a width as 32, and a depth (e.g., number of channels) as 3. For ease of description, the three dimensional size may be called an HWC format, where H refers to the height of the input tensor (e.g., 32 in the previous image example), W refers to the width of the input tensor (e.g., 32 in the previous image example), and C refers to the number of channels in the input tensor (e.g., 3 in the previous image example). In some cases, if there are multiple input tensors for a convolutional layer (e.g., when there are multiple images input into the convolution layer, or there are multiple input activation tensors received from a previous layer), each input tensor may be represented in an NHWC format, where N refers to an index of the input tensor within the batch of input tensors. In the following description, N may be omitted for simplicity (e.g., assuming there is only one input tensor) unless explicitly stated otherwise. It may be obvious for a person in the art to expand the embodiments to cover the cases with N>1.

In some embodiments, a CNN may include multiple convolution layers (e.g., the first convolution layer 120 and the second convolution layer 140 in FIG. 1). A convolution layer reduces an input tensor (e.g., the original input image, or an input tensor from a previous layer) into a form that is easier to process without losing features that are critical for getting a good prediction/classification. One or more feature detectors, e.g., edge detector, curve detector in image processing, may be involved in the convolution processing in the convolution layer. These feature detectors may be referred to as filters. Each of the filters may have the same number of channels as the input tensor does. For ease of description, this specification uses a term "sharing a plurality of channels" to express that each filter and the input tensor have the same number of channels. For example, the input tensor is a 32*32*3 matrix and an example filter may be a 3*3*3 matrix. A detailed explanation of the convolution processing may refer to the description of FIG. 2.

A convolution layer in a CNN may be followed by a nonlinear activation function to introduce nonlinearity into the CNN. Exemplary nonlinear activation functions include sigmoid, hyperbolic tangent, and rectified linear unit (ReLU). As shown in FIG. 1, a ReLU function (may also be referred to as a ReLU layer) follows each of the convolutional layers 120 and 140. The ReLU function may apply an elementwise activation function to filter out some outputs (activations) generated by the convolution layer 120 or 140. For example, a max(0,x) function may be adopted to filter out all the negative activations in the convolution output and only feed the positive activations to the next layer. A ReLU function may not change the size of the output activation, but limit the number of active neurons, since the negative activations are all zero-ed out, in order to improve the computational efficiency in the following layers.

A CNN may also include one or more pooling layers to provide a variety of computations that reduce the dimensionality of input tensors. In FIG. 1, the first pooling layer 130 and the second pooling layer 150 of the neural network 100 may each perform a down-sampling operation on the input tensor along the spatial dimension (height and width), but usually do not change the depth dimension (e.g., the number of channels).

A fully-connected (FC) layer in a neural network may learn non-linear combinations of high-level features as represented by the output from the previous layer (e.g., a pooling layer 150 in FIG. 1, or a convolution layer) and compute class scores accordingly. Referring to FIG. 1, the output from the pooling layer 150 may be first flattened (e.g., in a flatten layer 160) into a vector, from which an inherent non-learning function in that space may be learned by the FC layer 170 to calculate the final scores for a plurality of classes. Each of the scores may represent a quantified similarity between the alphabet in the input image and the corresponding class.

Figure 2:
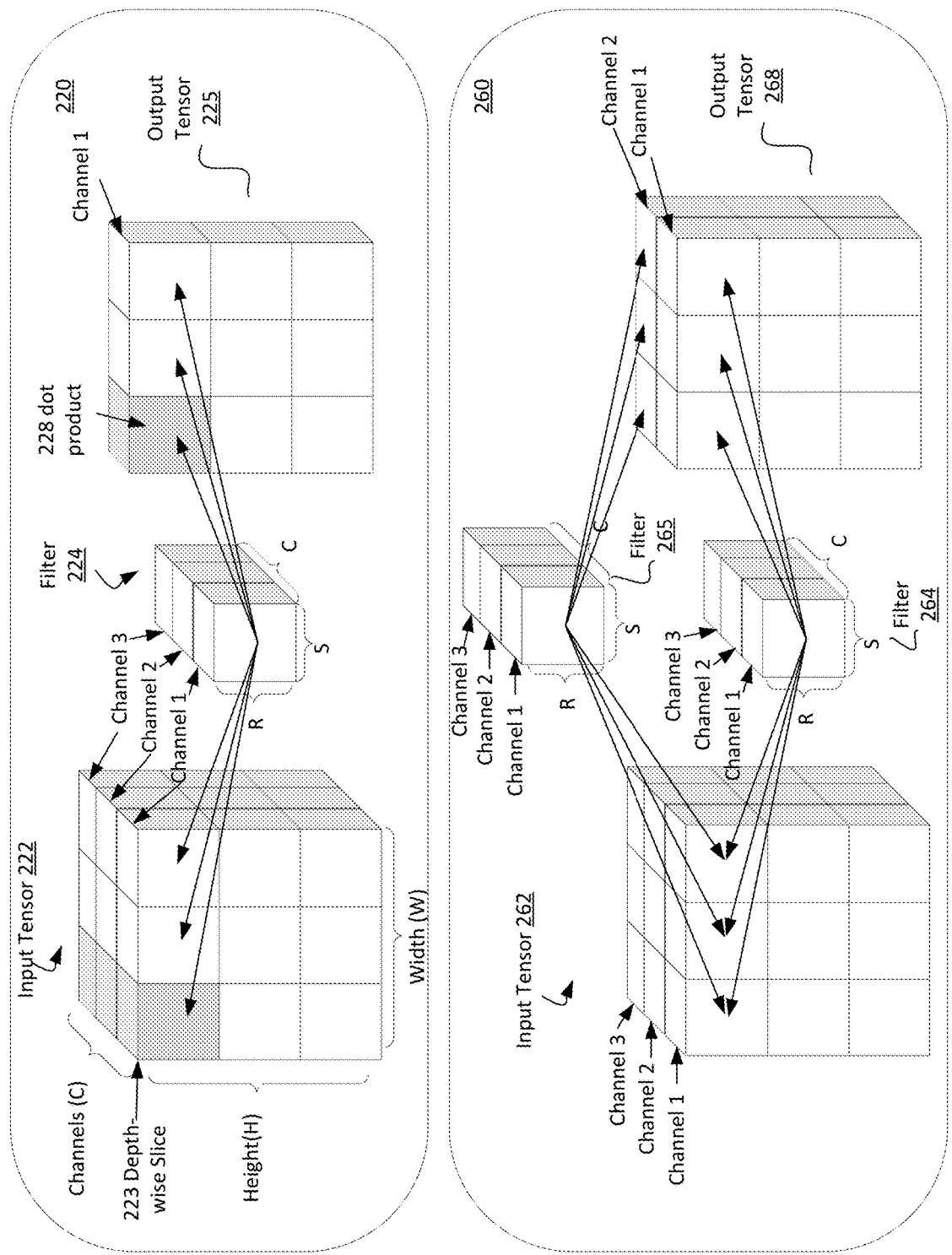
FIG. 2 illustrates exemplary convolution processing in accordance with various embodiments.

FIG. 2 illustrates exemplary convolution processing in accordance with various embodiments. The convolution processing 220 in FIG. 2 involves an input tensor 222, a filter 224, and an output tensor 225. The input tensor 222 may be denoted by its height (H), width (W), and number of channels (C). As shown in FIG. 2, the input tensor 222 may be a 3*3*3 matrix, with a height of 3, a width of 3, and a number of channels as 3. The height and the width (e.g., 3(H)*3(W)) of the input tensor 222 in each channel may be referred to as a 2-D input feature map. A tuple of {h, w, c} may point to one element of the 2-D input feature map in channel c. For example, {2,1,1} may point to the element of the 2-D input feature map in channel 1, with a position defined by {2,1} (e.g., height-wise index is 2, and width-wise index is 1). The filter 224 may be denoted by its height (R), width (S), and number of channels (C). In FIG. 2, the filter 224 may be a 1*1*3 matrix. The height and the width (e.g., 1(R)*1(S)) of the filter 224 in each channel may be referred to as a kernel (the filter 224 has three kernels in the three channels, respectively).

In some scenarios, a convolution processing may involve stride and padding. For example, when stride is 1, a filter convolves (e.g., moves, slides) one pixel at a time; and when stride is 2, the filter convolves two pixels at a time as it slides around. A larger stride produces a spatially smaller output tensor (smaller H*W in the output tensor). As another example, when a filter's spatial size (height*width) is greater than 1*1 (e.g., 3*3, or 5*5), the input tensor may pad with zeros around its borders in order to apply the filter and control the spatial size of the output tensor, e.g., to preserve the spatial size of the input tensor so that the input and output height and width are the same. In FIG. 2, it is assumed that no padding is performed to the input tensor 222 and the stride is 1.

During the convolution processing 220 shown in FIG. 2, MAC operations are performed on the filter 224 and each depth-wise slice, such as the first depth-wise slice 223, of the input tensor to generate a dot product, such as the dot product 228. For example, the first depth-wise slice 223 of the input tensor 222 is a 1*1*3 tensor at the top left of the input tensor 222 (the three grey cubes). Both the first depth-wise slice 223 and the filter 224 have a size of 1*1*3. After the MAC operations, the generated dot product 228 may be assembled as a part of the output tensor 225. As such, the output tensor 225 may be determined after the filter 224 convolves (e.g., moves) through all the depth-wise slices in the input tensor 222 (9 slices in FIG. 2). The number of channels in the output tensor 225 equals to the number of filters that have applied during the convolution. Since the convolution processing 220 only uses one filter 224, the corresponding output tensor 228 only has one channel.

In comparison, the convolution processing 260 involves two filters 264 and 265. By convolving the filter 264 through the input tensor 262, the values of the output tensor 268 in the first channel (e.g., a 2-D output feature map in channel 1) may be determined. By convolving the filter 265 through the input tensor 262, the values of the output tensor 268 in the second channel (e.g., a 2-D output feature map in channel 2) may be determined. Accordingly, the resulting output tensor 268 comprises two channels of 2-D output feature maps.

It may be noted that some operations during a convolution processing may be parallelized. For example, MAC operations performed on a filter are independent from the ones of another filter as different filters generate 2-D output feature maps for different output channels. As another example, the depth-wise slices in the input tensors are independent from each other as they generate values for different positions on each 2-D output feature map. The theoretically ideal parallelism may be achieved if all these operations can be parallelized among a plurality of processing entities (e.g., processors, cores, or threads). However, since real-world applications may have a large number of filters and massive input tensors, chasing the theoretically ideal parallelism may require hardware with unattainable computing capacities (e.g., with enormous number of processing entities and memory exchanging mechanism). The embodiments disclosed in the following provide a method (and corresponding system, storage medium) to achieve the ideal parallelism by fully utilizing the parallel processing capability of a given hardware, which is a more scalable and practical approach.

Figure 3:
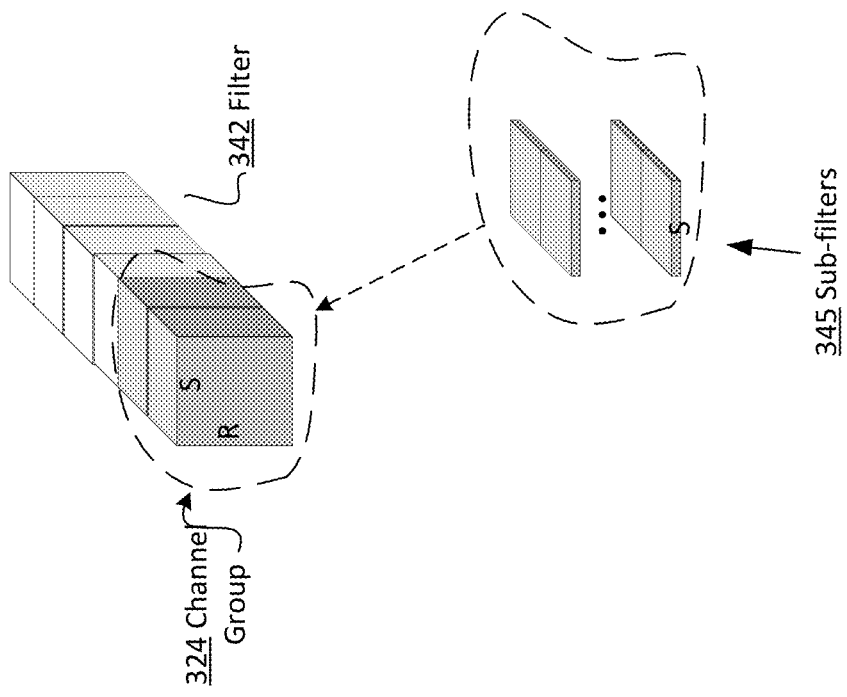
FIG. 3 illustrates an exemplary method for segmenting input tensors and filters in accordance with various embodiments.
Figure 3:
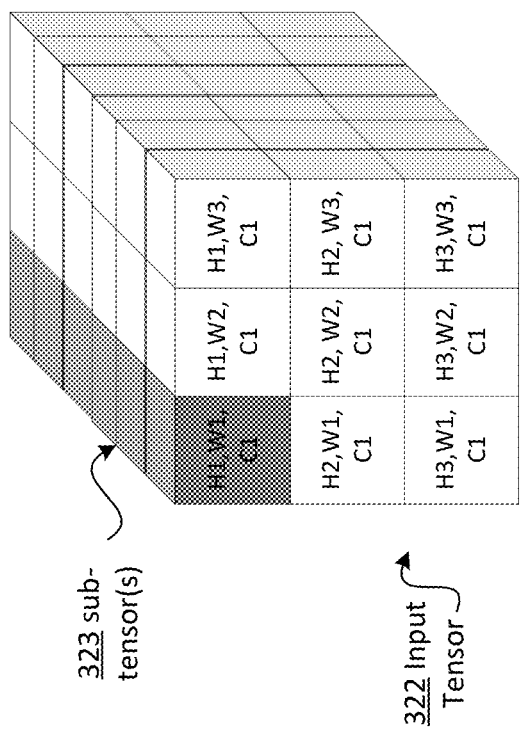

FIG. 3 illustrates an exemplary method for segmenting input tensors and filters in accordance with various embodiments. During each convolution process, each input tensor 322 and each filter 342 share a plurality of channels (i.e., having the same number of channels). Without loss of generality, each input tensor may be represented as a three dimensional tensor, with a height dimension (H), a width dimension (W), and a channel dimension (C); each filter may be similarly represented as a three dimensional tensor, with a height dimension (R), a width dimension (S), and a channel dimension (C). Each dimension may include a plurality of corresponding dimension units. For example, the input tensor 323 in FIG. 3 may be represented as 3(H)*3(W)*6(C), where the H dimension includes 3 height units, the W dimension includes 3 width units, and the C dimension includes 6 channels. In some embodiments, multiple input tensors may be involved in the convolution process, and the H*W*C representation of each of the multiple input tensors may be expanded with an extra dimension N (e.g., representing an input tensor identifier).

In some embodiments, the input tensor 323 may be segmented into a plurality of sub-tensors according to the number of available PEs. For example, the segmentation may guarantee that the plurality of sub-tensors can be equally distributed among the available PEs, so that the workloads on the PEs are evenly distributed. In some embodiments, the size of each sub-filter may be a height unit*a width unit*the number of channels in the filter. For example, the input tensor 322 in FIG. 3 may be segmented into a plurality of sub-tensors 323. As shown, the exemplary sub-tensor 323 has a single height unit in the height dimension, a single width unit in the width dimension, and a channel dimension with all the channels of the input tensor 322. Thus, the sub-tensor 323 may be represented by 1(H)*1(W)*6(C). In some embodiments, the sub-tensor such as 323 may be fetched by one PE a portion at a time, rather than fetching the entire sub-tensor 323 at once. In some embodiments, the sub-tensor 323 may be further segmented into a plurality of sub-tensors. For example, the six channels of 323 may be segmented into three channel groups with each comprising two channels, and each sub-tensor may accordingly be represented by 1(H)*1(W)*2(C). In some embodiments, the three sub-tensors in the shaded area in FIG. 3 may be processed by one PE, or three different PEs.

In some embodiments, the filter 342 may be pruned or sparsified to limit the number of non-zero weights therein. The sparsified filters may greatly increase the computational efficiency without significantly losing the accuracy of feature extraction from the input tensor. In some embodiments, the filter 342 may be pruned in a balanced manner so that every predetermined number of channels comprise a fixed number of non-zero weights. This balanced-weight pruning may facilitate the pipeline design for scalable parallel processing. One exemplary way to achieve this goal is to divide the channel dimension of the filter into a plurality of channel groups, and prune the number of non-zero weights within each channel group (also called channel-group level pruning). For example, assuming the filter is a tensor or 3(R)*3(S)*32(C), the 32 channels may be divided into four channel groups, with each channel group including 8 consecutive channels (e.g., channels 0~7, channels 8~15). The pruning process ensures that the number of non-zero weights in each of the channel groups are the same.

In some embodiments, after the filters are pruned or sparsified, each of the filters may be may be segmented by the following process: for each of the filters, dividing its channel dimension into a plurality of channel groups; and segmenting, according to the plurality of channel groups, the filter into a plurality of sub-filters with each corresponding to one of the plurality of channel groups. In some embodiments, the filter may first be segmented into a plurality of chunks according to the plurality of channel groups, and then segmented along its height dimension to obtain the plurality of sub-filters, wherein each of plurality of sub-filters shares the width dimension with the original filter.

For example, a filter may be segmented into a plurality of chunks corresponding to the plurality of channel groups; and each of the plurality of chunks may further be segmented along the height dimension to obtain a plurality of sub-filters, wherein each of the plurality of sub-filters shares the width dimension with the filter. Still taking the above 3(R)*3(S)*32(C) filter as an example, the filter may first be segmented into four chunks corresponding to the four channel groups (e.g., channels 0~7, channels 8~15), with each chunk being a 3(R)*3(S)*8(C) tensor. Then each of the four 3(R)*3(S)*8(C) tensors may be segmented along its height dimension (R dimension) into three horizontal planes, with each plane being a 1(R)*3(S)*8(C) tensor. In this way, the 3(R)*3(S)*32(C) tensor is segmented into twelve 1(R)*3(S)*8(C) tensors, which may be denoted as sub-tensors in the following description.

Referring to the exemplary filter 342 in FIG. 3, it is presumed the filter 342 has a plurality of height units in its height dimension (R>1), a plurality of width units in its width dimension (S>1), and six channels. During segmentation, the six channels may be divided into three channel groups 324. Each of the channel groups 324 may then be segmented into a plurality of 1(H)*S*C sub-filters 345 (with one height unit in the height dimension). In some embodiments, even though the channel-group level pruning assures that all channel groups have the same number of non-zero weights, the horizontal planes (i.e., the sub-filters) within the channel groups may go through another round of plane-level pruning (also called sub-filter-level pruning). The pruning process ensures that each of the sub-filters comprises the same number of non-zero weights, even though the positions of the non-zero weights within each sub-filter may be different.

Figure 4:
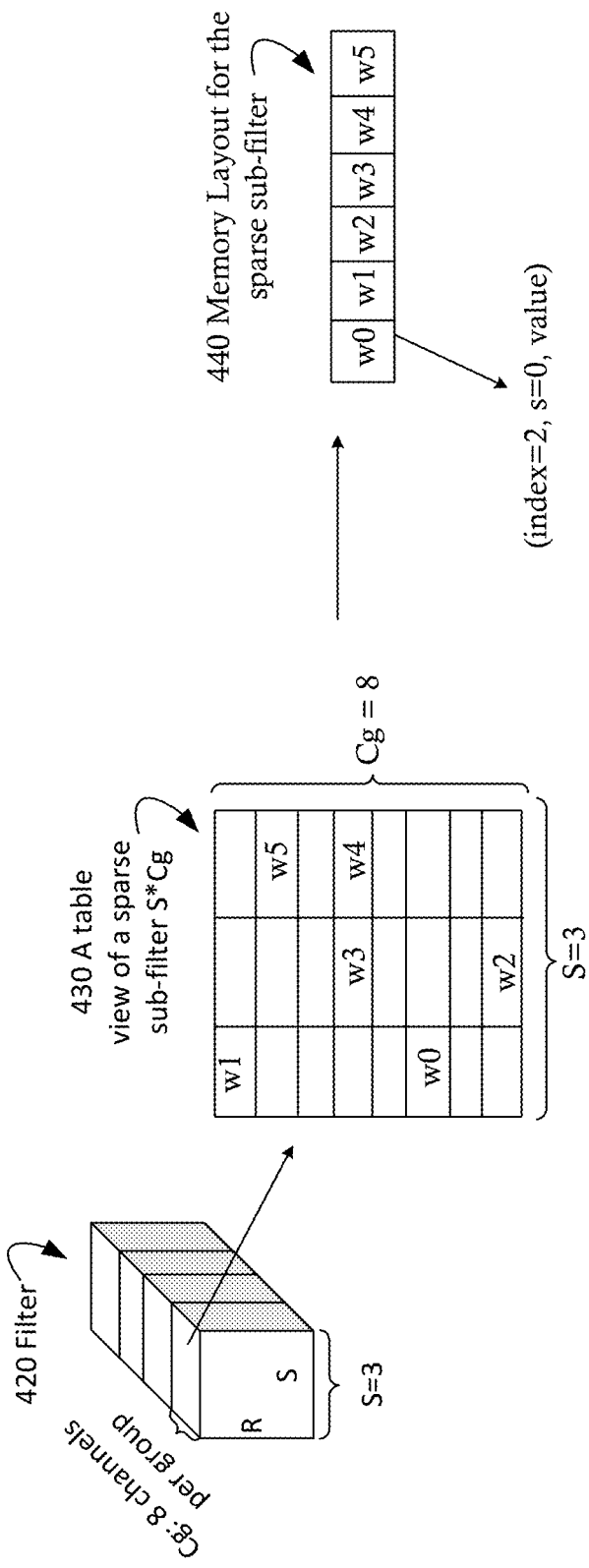
FIG. 4 illustrates an exemplary memory layout for storing non-zero weights of a sub-filter in accordance with various embodiments.

FIG. 4 illustrates an exemplary memory layout for storing non-zero weights of a sub-filter in accordance with various embodiments. The exemplary filter 420 in FIG. 4 is presumed as an R*3(S)*32(C) tensor, where the R dimension may comprise a number of height units (in practical, R usually equals to S). After the segmentation described in FIG. 3, the 32 channels in the filter 420 may be divided into four groups of channels (denoted as Gc=4), with eight channels per group (denoted as Cg=8). Each of the channel group may be further segmented into horizontal planes to obtain the 1(R)*3(S)*8(C) sub-filters. The exemplary sub-filter 430 in FIG. 4 may be logically shown as a 3*8 table, where the 3 corresponds to the S dimension of the sub-filter 430, and the 8 corresponds the C dimension of the sub-filter 430. As shown, the exemplary sub-filter 430 comprises six non-zero weights (w0~w5).

In some embodiments, the non-zero weights of a sub-filter may be represented as index-value pairs. Each of the index-value pairs comprises a channel-dimension index, a width-dimension index, and a corresponding non-zero weight. For the sake of illustration, FIG. 4 shows a table view of a sub-filter 430 of size 1(R)*3(S)*8(Cg) with 6 non-zero weights, denoted as W0 to W5. For example, the first non-zero weight w0 of the sub-filter 430 is located in channel 2 (assuming the channel identifiers start from the bottom of the table with index 0) and at position 0 in the width-dimension (e.g., S dimension). Thus, w0 may be represented as (index=2, s=0, value) pair, where index=2 indicates that the current non-zero weight is in channel 2, s=0 indicates the current non-zero weight is at position 0 in the width dimension, and value is the non-zero weight. In the same way, the other non-zero weights in the sub-filter 430 may also be represented as corresponding index-value pairs. Depending on the implementation, each index-value pair may be represented by a number of bits, such as 8, 16, or 32 bits. These index-value pairs may then be aggregated as a series of bits or a bit array 440 to represent the sub-filter 430. The bit array 440 may have a size of (number of non-zero weights per sub-filter)*(number of bits per index-value pair) in bits. Representing the sub-filters with the bit array 440 memory layout may reduce the memory footprint of the filters, and simplify the design for parallel convolution processing.

In some embodiments, the bit array 440 may be expanded to accommodate different ways of segmentation performed on the filter 420. For example, if the sub-filter 430 generated by segmenting the filter is a 2(R)*3(S)*8(C) tensor (e.g., the sub-filter 430 comprises two planes along the R dimension instead of one), the index-value pair representation of the sub-filter 430 may further comprise an R dimension index in addition to the C dimension index, the S dimension index, and the non-zero weight.

Figure 5:
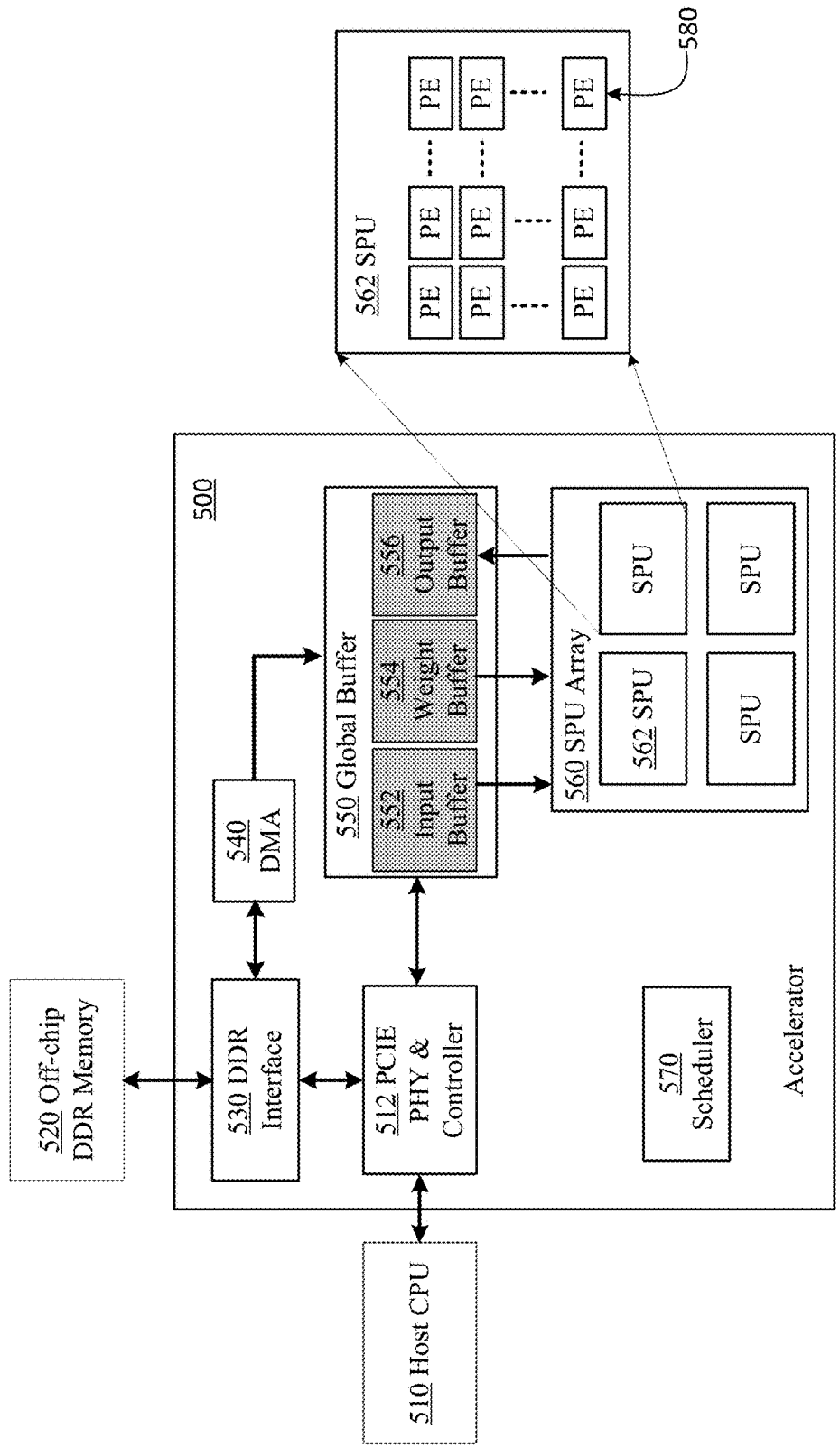
FIG. 5 illustrates an exemplary system diagram for balanced-weight convolution processing in accordance with various embodiments.

FIG. 5 illustrates an exemplary system diagram for balanced-weight convolution processing in accordance with various embodiments. The architecture shown in FIG. 5 comprises a computer system designed to perform inferences when a neural network is loaded and runs. In some embodiments, such a computer system is implemented as a hardware accelerator 500. Some components in the hardware accelerator 500 may collaborate in a specific way to improve the throughput and energy efficiency of neural networks by facilitating parallel convolution computations on a plurality of processing entities. The accelerator 500 is merely illustrative, and may comprise more, fewer, or alternative components. The hardware accelerator 500 may be designed as a reconfigurable device such as a field-programmable gate array (FPGA), or an application-specific integrated circuit (ASIC).

As shown in FIG. 5, the hardware accelerator 500 may comprise a scheduler 570 to control the workflow within the accelerator 500 and interactions with off-chip components such as a host CPU 510 and double data rate (DDR) memories 520. For example, the accelerator 500 may interact with the host CPU 510 through a peripheral component interconnect express (PCIe) physical layer (PHY) controller 512, and an off-chip DDR memory 520 through a DDR interface 530. The accelerator 500 may fetch data from the off-chip DDR memory 520 through a direct memory access (DMA) controller 540 that communicates with the off-chip DDR memory 520 via the DDR interface 530. The fetched data may be stored in an on-chip buffer, called global buffer 550, to prepare for parallel convolution computations. The global buffer 550 may be logically divided into multiple sections, such as an input buffer 552, a weight buffer 554, and an output buffer 556. The input buffer 552 may store data associated with input tensors, the weight buffer 554 may store data associated with filters, and the output buffer 556 may store data associated with results of convolution computations (e.g., output tensors). The global buffer 550 may exchange data with an array 560 of Sparse Processing Unit (SPU) 562 to perform convolution computations. The "sparse" in the name of SPU indicates that the SPU array 560 is specifically designed to efficiently perform convolution computations involving sparseness (e.g., sparse input tensors, and/or sparse filters). Each of the SPU 562 may comprise a plurality of processing entities (PE) 580, where each PE 580 may handle a unit amount of convolution computation.

Figure 6:
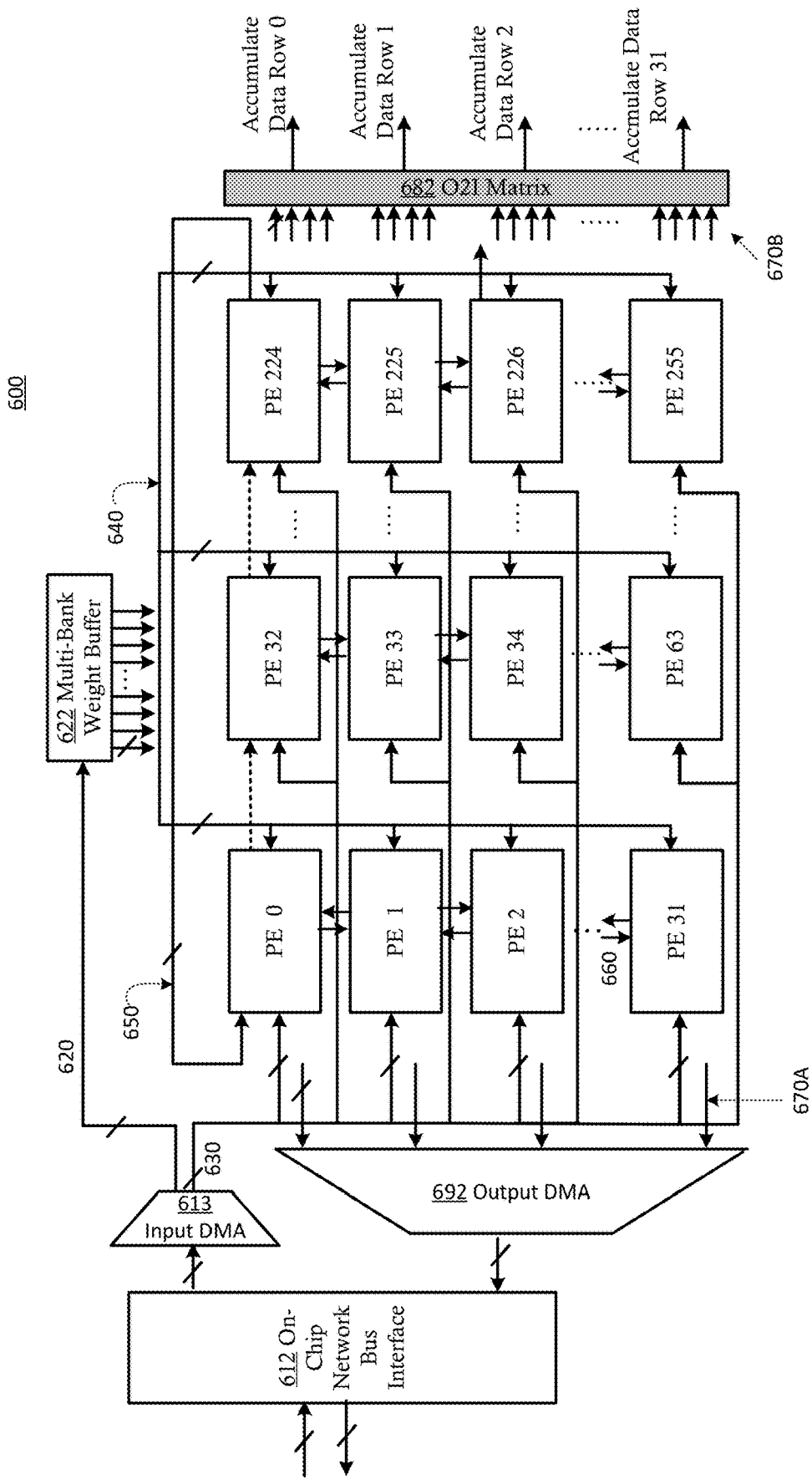
FIG. 6 illustrates an exemplary system architecture for balanced-weight convolution processing in accordance with various embodiments.

FIG. 6 illustrates an exemplary system architecture 600 for balanced-weight convolution processing in accordance with various embodiments. The system architecture 600 is an exemplary implementation of the hardware accelerator 500 shown in FIG. 5. As shown, the system architecture 600 may include an on-chip Network Bus Interface 612, a Multi-Bank Weight Buffer 622, a plurality of PEs (PE 0~PE 255), an O2I Matrix 690, direct memory access (DMA) interfaces including an input DMA interface 613 and an output DMA interface 692, and a plurality of wires connecting the aforementioned components. The system architecture 600 is merely illustrative, and depending on the implementation, the system architecture 600 may comprise more, fewer, or alternative components. For the purpose of simplicity, some of the wirings in the architecture 600 are not shown in FIG. 6.

The exemplary system architecture 600 in FIG. 6 comprises 256 PEs, which are arranged as a 32*8 matrix of PEs from a logic perspective. Each of these PEs may include various internal buffers, such as an iBuffer to store one or more input sub-tensors, a wBuffer to store one or more sub-filters, various gates to perform MAC operations (e.g., at least a multiplier and an accumulator), an accumulation buffer to store partial results, another suitable component, or any combination thereof. In some embodiments, a controller such as the scheduler 570 in FIG. 5 may schedule tasks to be executed by each of the PEs. Each of the PEs may generate a partial result of the convolution process that may be aggregated to form an output tensor.

In some embodiments, the on-chip Network Bus Interface 612 in FIG. 6 may receive an input tensor and one or more filters that are necessary to perform a convolution process. These received input tensor and filters may be sent to the components in the architecture 600 through the input DMA interface 613. The input tensor and filters may have already been segmented before reaching the on-chip Network Bus Interface 612. In other embodiments, these input tensor and filters are segmented after leaving the on-chip Network Bus Interface 612 but prior to being distributed into the plurality of PEs. In some embodiments, the on-chip Network Bus Interface 612 may forward the received filters to the Multi-Bank Weight Buffer 622. The Multi-Bank Weight Buffer 622 is a place where the non-zero weights in the filters are stored and distributed to the PEs. In some embodiments, the Multi-Bank Weight Buffer 622 receives a plurality of segmented sub-filters represented as bit arrays, and distribute these bit arrays to the PEs.

Once the input tensor is segmented into the plurality of sub-tensors, the on-chip Network Bus Interface 612 may distribute (e.g., assign by broadcasting) the plurality of sub-tensors to the PEs through the wiring 630. In some embodiments, each of the PEs may receive one or more sub-tensors with each comprising all the channels of the input tensor. For example, for an input tensor with 32 channels, each PE may receive a 1(H)*1(W)*32(C) sub-tensor that has one height unit in its height dimension, one width unit in its width dimension, and all the 32 channels of the input tensor in its channel dimension (e.g., the sub-tensor 323 of the input tensor 322 in FIG. 3). This way, each PE may use and update the received one or more sub-tensors continuously throughout multiple convolution processes (corresponding to multiple convolution layers in a NN) without swapping out or returning the partial results after each convolution process.

In some embodiments, the Multi-Bank Weight Buffer 622 may distribute the plurality of sub-filters to the plurality of PEs through the wiring 640 for each PE to perform local MAC operations. Each PE may have a local First-In-First-Out (FIFO) weight buffer to store the assigned sub-filters. If the FIFO weight buffer in each PE is not sufficiently large, each PE may fetch (or the Multi-Bank Weight Buffer 622 may distribute) new sub-filters as the older ones are processed.

In some embodiments, each PE may have a wiring 660 (e.g., a bidirectional wiring) with its neighboring PEs in the same column to share certain data stored in its buffer and/or fetch certain data from its neighboring PEs. The "certain data" here may refer to a portion of a sub-tensor. This data sharing may be necessary between neighboring PEs when the convolution process configures the stride as greater than one.

In some embodiments, the PEs in the same row may be connected with wiring 650 to rotate the partial sums obtained by each of them. The direction of the wiring 650 (PE0 to PE 32 to PE 64 . . . to PE224 and back to PE0) in FIG. 6 is illustrative, and may be different depending on the implementation. For example, in FIG. 6, after PE224 finishes its local MAC operations based on the assigned sub-tensor and sub-filters and obtains one or more intermediate results, it may need to accumulate the intermediate results with the partial sum obtained by PE190 (not shown in FIG. 6). The PEs in the other rows may also be connected with a wiring similar to the wiring 650 for rotating the local intermediate results.

In some embodiments, the MAC operation results obtained by each of the PEs may be aggregated through the wiring 670A and returned to the upper level memory/buffer through the output DMA interface 692 to the on-chip network bus interface 612. For example, if the current convolution process corresponds to the last convolution layer in the NN, the MAC operation results may be aggregated into an output tensor to be returned through the DMA interface. In some embodiments, the MAC operation results may be aggregated through the wiring 670B and reorganized in a O2I Matrix 682 in order to generate the output tensor. In some embodiments, the O2I Matrix 682 may output the accumulated data for each row of PEs. These accumulated data may eventually form the output tensor. The wirings 670A and 670B in FIG. 6 are merely illustrative and for ease of reference. In some embodiments, each of the plurality of PEs may have a 670A wiring and/or a 670B wiring to output its local MAC operation results.

Figure 7:
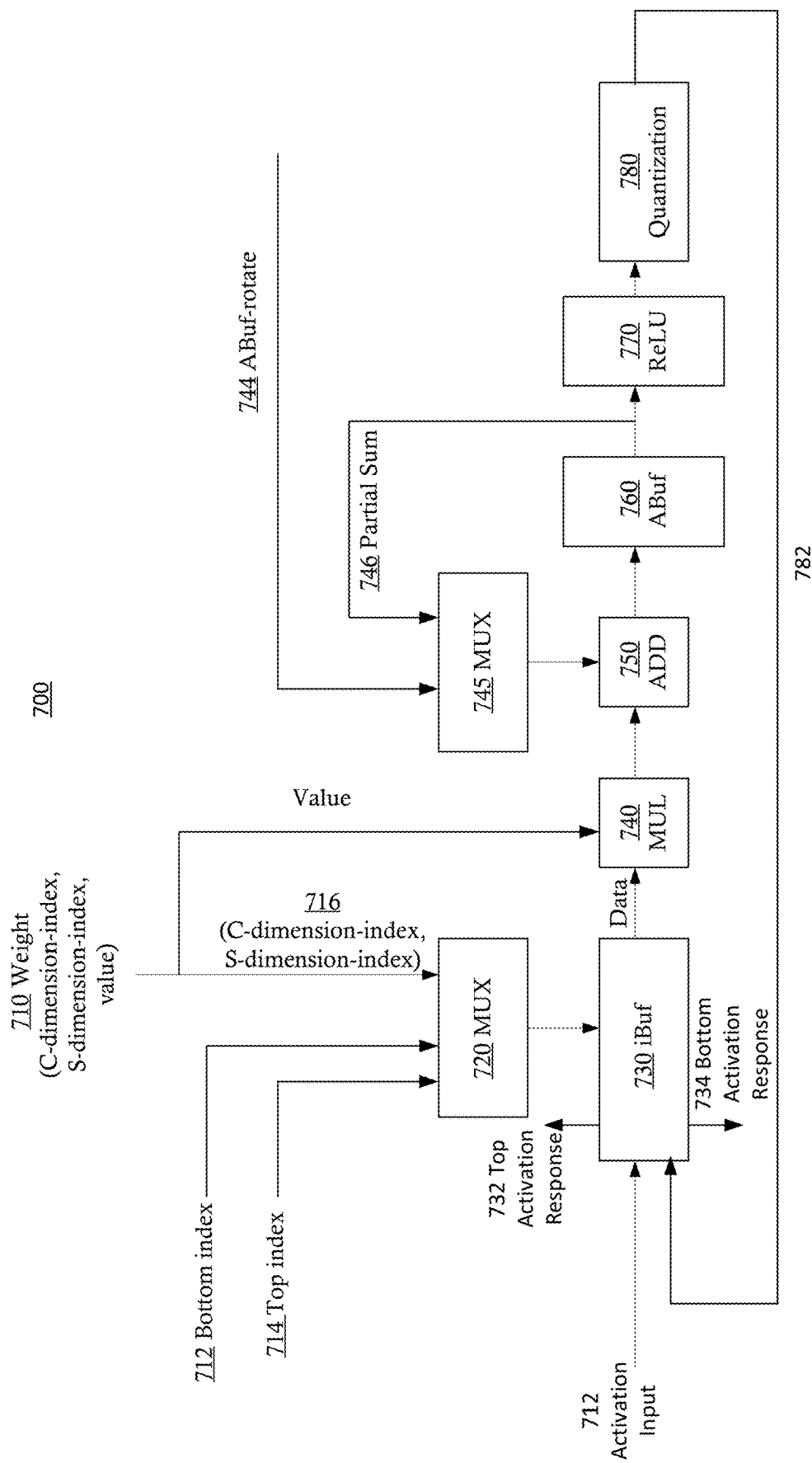
FIG. 7 illustrates an exemplary diagram of a processing entity for balanced-weight convolution processing in accordance with various embodiments.

FIG. 7 illustrates an exemplary diagram of a processing entity (PE) 700 for balanced-weight convolution processing in accordance with various embodiments. The exemplary PE 700 in FIG. 7 may refer to any one of the PEs 580 in FIG. 5, or any one of the PEs in FIG. 6. The PE 700 may comprise an iBuffer 730 (denoted as iBuf) for storing one or more input sub-tensors, a multiplication gate 740 (denoted as "X") for performing multiplication operations, an addition gate 750 (denoted as "+") for performing accumulation operations, an accumulation buffer 760 (denoted as "ABuf") for storing intermediate results (e.g., partial sums of MAC operations), a ReLu unit 770 as a nonlinear activation function, a quantization unit 780 for reducing or otherwise adjusting the number of bits in representing the intermediate results, and various multiplexer gates (denoted as "MUX," such as 720 and 745) for selecting proper inputs for some of the aforementioned components. The components and the pipeline connecting the components in FIG. 7 are merely illustrative. Depending on the implementation, the PE may comprise more, fewer, or alternative components, or have a different pipeline.

As described above, a PE 700 may perform local convolution processing based on one or more input sub-tensors and a plurality of non-zero weights from one or more sub-filters. The PE 700 may receive the input sub-tensors from an upper level memory (such as the global buffer 550 in FIG. 5) through an activation input wiring 712 and store them in its iBuf 730. In some embodiments, the iBuf 730 may receive an index or a set of indexes from MUX 720 to identify a desired input value or an input sub-tensor. Based on a controller or a scheduler (such as the scheduler 570 in FIG. 5), the MUX 720 may select one input from a plurality of input options for the iBuf 730 to identify the desired input value or the input sub-tensor. For example, the plurality of input options for the MUX 720 may include a bottom index 712 requested by a neighboring PE (e.g., the PE below the PE 700 in a matrix similar to the PE matrix in FIG. 6), a top index 714 requested by another neighboring PE (e.g., the PE above the PE 700 in a matrix similar to the PE matrix in FIG. 6), or an index of a non-zero weight 710 (e.g., the index comprises the channel dimension index and the width dimension index). The bottom index 712 and top index 714 requests may be necessary when the neighboring PEs require the input value(s) in the PE 700 to perform their local MAC operations, for example, when the stride of the convolution processing is greater than one. In some embodiments, the bottom index 712 and the top index 714 may be used to retrieve an input value or an input sub-tensor from iBuf 730. The retrieved data may be returned through the top activation response wiring 732 back to the PE above the PE 700, and/or through the bottom activation response wiring 734 to the PE below the PE 700, respectively. The wiring 732 and 734 may refer to the bidirectional wiring 660 in FIG. 6.

In some embodiments, the non-zero weights 710 assigned to the PE 700 are in the form of index-value pairs. Detailed description of the index-value pair format may refer to the description of FIG. 4. For example, each non-zero weight 710 may be represented as a plurality of bits (e.g., 16 bits or 32 bits) comprising a channel-dimension index (denoted as C-dimension index), a width-dimension index (denoted as S-dimension index), and the value of the non-zero weight. The C-dimension index and the S-dimension index of the non-zero weight may be used to identify the corresponding input value from the iBuf 730 to participate a MAC operation. For example, the non-zero weight 710 is in channel C and at position S, and it corresponds to an input value in channel C and at position S in the input sub-tensor. As shown in FIG. 7, the two indexes of the non-zero weight 710 may be fed into the MUX 720 through the wiring 716.

In order to perform the MAC operation, the retrieved input value from the iBuf 730 and the value of the non-zero weight 710 may be fed into the multiplier 740. The result (e.g., a product of the non-zero weight and the corresponding input value) may be fed into an accumulator 750. The accumulator 750 accumulates the product with a previously calculated partial sum to form a new partial sum. For example, the previously calculated partial sum and the product may be from the same sub-tensor but different channels. As shown, the previously calculated partial sum may be selected by the MUX 745 from two options: the partial sum 744 rotated from the ABuf of a neighboring PE (e.g., through the rotating wiring of 650 in FIG. 6), and the partial sum 746 selected from its local ABuf 760. In some embodiments, the MUX 745 may first keep selecting the partial sum 746 from its local ABuf 760 until the local MAC operations are finished, and then select the partial sum 744 rotated from the neighboring PE. Here, the local MAC operations refer to the MAC operations based on the non-zero weights 710 assigned to the PE 700.

In some embodiments, the accumulation result generated by the accumulator 750 may be stored in the ABuf 760 (e.g., by replacing the older version partial sum). In some embodiments, the accumulation result may go through the ReLU unit 770 for activation, and the Quantization 780 unit to reduce the number of bits in the result so that it can be stored in the iBuf 730 through the wiring 782. In some embodiments, the ReLu unit 770 and Quantization unit 780 may be optional.

Figure 8A:
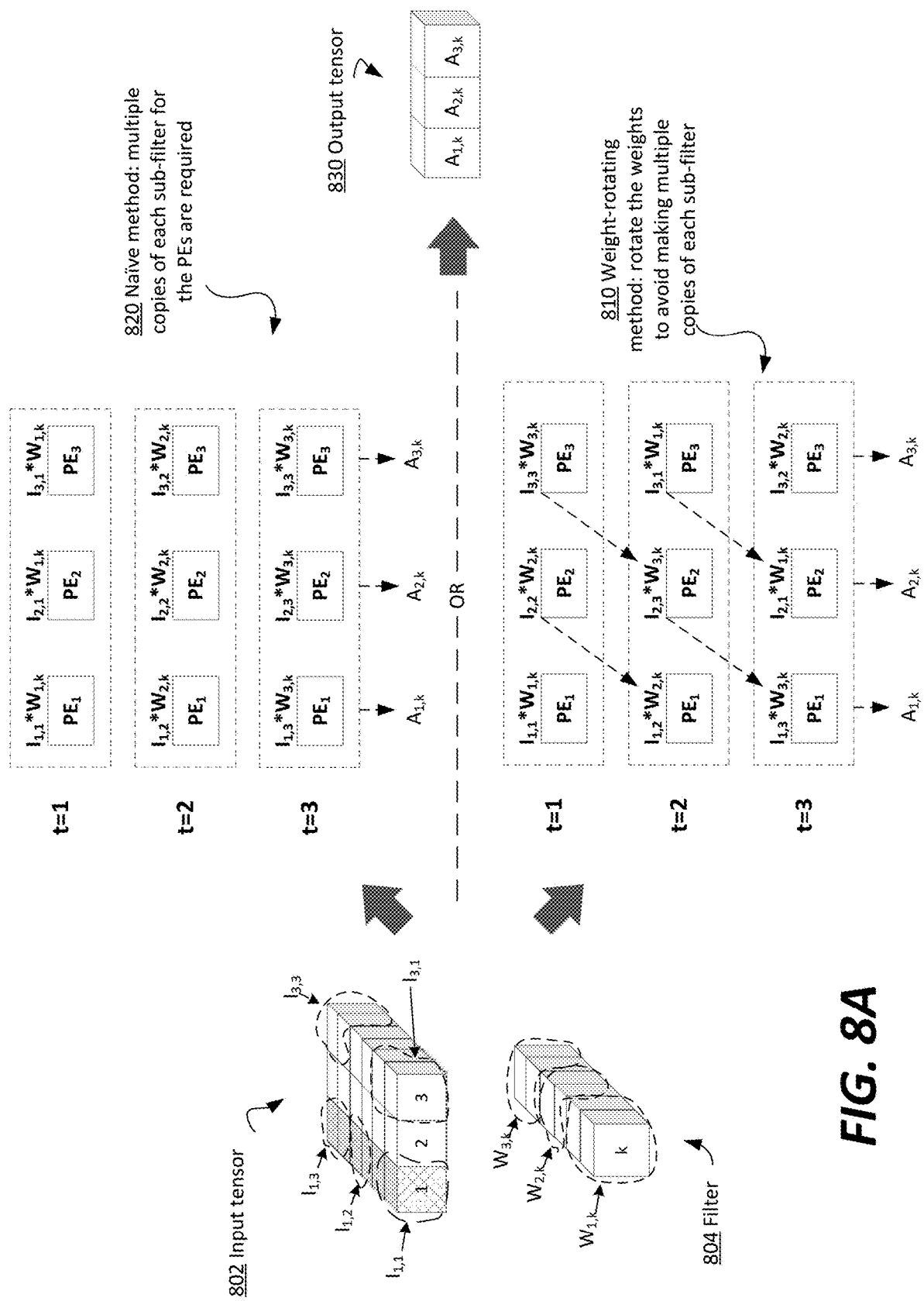
FIG. 8A illustrates an exemplary flow diagram for parallel balanced-weight convolution processing in accordance with various embodiments.

FIG. 8A illustrates an exemplary flow diagram for parallel balanced-weight convolution processing in accordance with various embodiments. The aforementioned segmentation of the input tensor/filters and the balanced-weight representation of the filters empower a parallel convolution processing. In some embodiments, a plurality of PEs host the plurality of input sub-tensors, and perform local MAC operations based on the locally stored sub-tensor(s) and the assigned sub-filter(s). Since one PE's MAC operations do not depend on another PE's result, there is no dependence between the plurality of PEs, and thus the convolution process naturally becomes parallel. However, randomly assigning the sub-filters to the plurality of PEs may not yield the optimal parallel processing efficiency.

As mentioned above, the filters may be segmented by the following process: for each of the filters, dividing its channel dimension into a plurality of channel groups; and segmenting, according to the plurality of channel groups, the filter into a plurality of sub-filters with each corresponding to one of the plurality of channel groups. In some embodiments, the filter may first be segmented into a plurality of chunks according to the plurality of channel groups, and then segmented along its height dimension to obtain the plurality of sub-filters, wherein each of plurality of sub-filters shares the width dimension with the original filter. During the process of assigning sub-tensors and sub-filters to the plurality of PEs, a subset of the plurality of input sub-tensors from the same horizontal plane of the input tensor are respectively assigned to a subset of the PEs (e.g., one row of PEs in FIG. 6), and the plurality of sub-filters may be assigned to the subset of PEs by: identifying a subset of the plurality of sub-filters that are from a same filter but correspond to different channel groups; and respectively assigning the subset of the plurality of sub-filters to the subset of PEs.

As shown in FIG. 8A, an example input tensor 802 has a size of 1*3*6, with a height as 1, a width as 3, and a number of channels as 6. The input tensor 802 may be segmented into three chunks 1, 2, 3 along the width dimension, where the first chunk is represented by the shaded area of the input tensor 802 in FIG. 8A. Each of the chunks may be further divided into three sections along the channel dimension, with each section having a size of 1*1*2. That is, the six channels in each chunk are divided into three channel groups. Each of the sections may be denoted as $I_{x,y}$, where x refers to a position on the 2-D input feature map in the input tensor, and y refers to the channel group index. In the following description, the 1*1*2 sections are treated as sub-tensors.

In real-world applications, there may be a plurality of filters involved in each convolution process. For ease of reference and description, only one filter 804 (size of 1*1*6) is shown in FIG. 8A to demonstrate how the sub-filters are distributed to the PEs. Assuming the channels of the filter 804 are similarly divided into three channel groups, i.e., three 1*1*2 sub-filters. Each of the sub-filters is denoted as $W_{y,k}$, where y refers to the channel group that the sub-filter belongs is in, and k refers to the identifier of the filter 804 that the sub-filter belongs to. For example, $W_{1,k}$ refers to the sub-filter that is in the channel group 1 and belongs to the filter k (here, the filter 804).

After the input tensor 802 and the filter 804 are segmented, the sub-tensors and sub-filters are assigned to a plurality of PEs for multiple rounds of parallel processing. FIG. 8A illustrates two methods to assign the sub-tensors and sub-filters to the plurality of PEs: a naive method 820, and a weight-rotating method 810. In both methods, three PEs are used for the multiple rounds of parallel processing.

In the naive method 820, during the first round of parallel processing (t=1), $PE_1$, $PE_2$, and $PE_3$ handle the sub-tensors from the first channel group, and are assigned with $I_{1,1}*W_{1,k}$, $I_{2,1}*W_{1,k}$, and $I_{3,1}*W_{1,k}$ respectively. That is, the same sub-filter $W_{1,k}$ is used by $PE_1$, $PE_2$, and $PE_3$ to generate multiplication results. Here, "*" refers to multiplication operations. During the second round of parallel processing (t=2), $PE_1$, $PE_2$, and $PE_3$ handle the sub-tensors from the second channel group, and are assigned with $I_{1,2}*W_{2,k}$, $I_{2,2}*W_{2,k}$, and $I_{3,2}*W_{2,k}$ respectively. That is, the same sub-filter $W_{2,k}$ is used by $PE_1$, $PE_2$, and $PE_3$ to generate multiplication results. Similarly, during the third round of parallel processing (t=3), $PE_1$, $PE_2$, and $PE_3$ handle the sub-tensors from the first channel group, and are assigned with $I_{1,3}*W_{3,k}$, $I_{2,3}*W_{3,k}$, and $I_{3,3}*W_{3,k}$ respectively. That is, the same sub-filter $W_{3,k}$ is used by $PE_1$, $PE_2$, and $PE_3$ to generate multiplication results. After the three rounds of parallel processing, the multiplication results generated by $PE_1$ may be accumulated to generate the partial sum $A_{1,k}$ (an activation for a next NN layer) of the first (left) 1*1*6 tensor of the input tensor 802 with the 1*1*6 filter 804. Similarly, the MAC results generated by $PE_2$ may be accumulated to generate the partial sum $A_{2,k}$ of the second (middle) 1*1*6 tensor of the input tensor 802 with the 1*1*6 filter 804, and the MAC results generated by $PE_3$ may be accumulated to generate the partial sum $A_{3,k}$ of the third (right) 1*1*6 tensor of the input tensor 802 with the 1*1*6 filter 804. These partial sums may be subsequently assembled as the output tensor 830.

In some embodiments, the weight-rotating method 810 in FIG. 8A may comprise reassigning the plurality of sub-filters to the available processors by rotating a sub-filter that was assigned to an i-th processor to an (i+1)-th processor. As shown in FIG. 8A, during the first round of parallel processing (t=1) using the weight-rotating method 810, $PE_1$, $PE_2$, and $PE_3$ handle three sub-tensors from all three channel groups, and are assigned with $I_{1,1}*W_{1,k}$, $I_{2,2}*W_{2,k}$, and $I_{3,3}*W_{3,k}$ respectively. During the second round of parallel processing (t=2), the weights assigned to $PE_1$, $PE_2$, and $PE_3$ are rotated (left rotation in FIG. 8A). As shown in FIG. 8A, when t=2, the $PE_1$, $PE_2$, and $PE_3$ are assigned with $I_{1,2}*W_{2,k}$, $I_{2,3}*W_{3,k}$, and $I_{3,1}*W_{1,k}$ respectively. Similarly, when t=3, $PE_1$, $PE_2$, and $PE_3$ are assigned with $I_{1,3}*W_{3,k}$, $I_{2,1}*W_{1,k}$, and $I_{3,2}*W_{2,k}$ respectively. That is, one sub-filter is assigned to $PE_x$ during the first round, and is rotated to $PE_{x-1}$ during the second round, and is further rotated to $PE_{x-2}$ during the third round. After the three rounds of parallel processing, the multiplication results generated by each of $PE_1$, $PE_2$, and $PE_3$ may be accumulated to generate a partial sum. These partial sums may be subsequently assembled as the output tensor 830.

In a comparison of the naive method 820 and the weight-rotating method 810, the naive method 820 may require the same sub-filter to be copied three times for the three PEs during each round of parallel processing, and after each round, the three PEs may need to fetch the next weight from memory of a higher level (e.g., from the off-chip DDR memory 520 in FIG. 5). Since the three rounds are sequentially processed, these weights are fetched sequentially from the higher level memory. Accessing data from a higher level memory is usually costly and slow. In contrast, the weight rotating method 810 may fetch all the three weights during the first round of parallel processing. This memory fetching step may be performed in parallel (e.g., each PE reads its assigned weights). For the following rounds, the weights are rotated among the PEs instead of being fetched from the higher level memory. Since rotating the weights among the PEs occurs within a lower-level memory system, it may yield faster speed and less energy cost. In some embodiments, the neighboring PEs may be connected by a direct channel to exchange cached data, which may further facilitate the weight rotation.

Figure 8B:
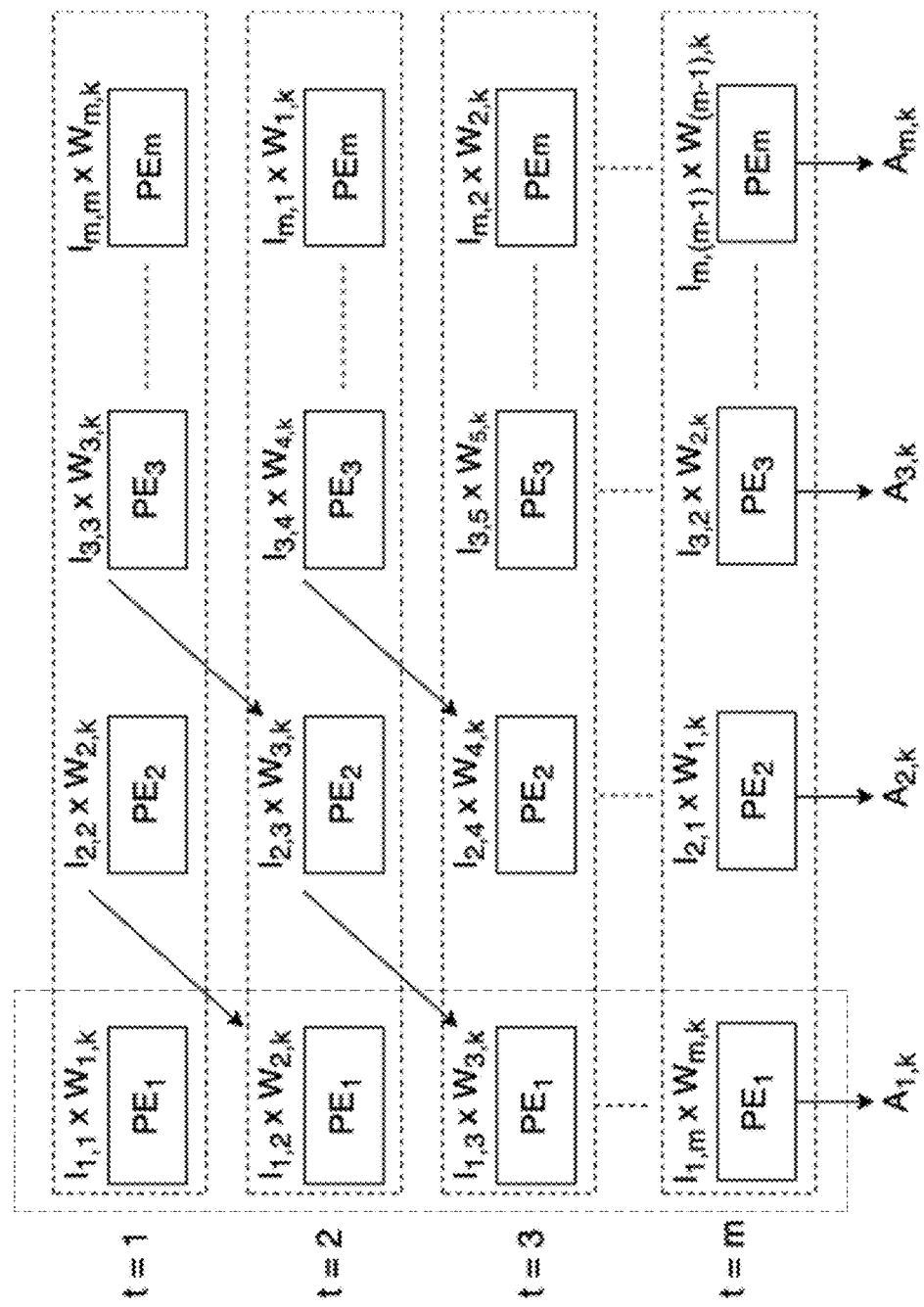
FIG. 8B illustrates another exemplary flow diagram for parallel balanced-weight convolution processing in accordance with various embodiments.

FIG. 8B illustrates another exemplary flow diagram for parallel balanced-weight convolution processing in accordance with various embodiments. The flow diagram in FIG. 8B is a generalized version of the weight-rotating method in FIG. 8A. The MAC operations to be performed in this example involve a batch of input tensors (comprising N input tensors) and a group of filters. The channels of each input tensor are segmented into a plurality of channel groups denoted as Gc (Groups of Channels, or the number of channel groups), with each Gc comprising Cg (Channels per Group) channels; and the 2-D input feature map of the input tensor is segmented into Gh*Gw (Groups of Height*Groups of Width) segments; the channels of the filter is similarly segmented according to the plurality of channel groups Gc.

With the above denotations, the total number of summations to be generated by the MAC operations on the N input tensors and the filter is B=N*Gh*Gw. Formally, the summations may be represented by the following formula:

$$\sum_{j=1}^{m} I_{ij} \otimes w_{jk} = A_{ik}, i = \overline{1 \dots B}.$$

where m refers to Gc (number of channel groups), i refers to the $i_{th}$ summation of the B summations, j refers to the $j_{th}$ channel group in the m channel groups, k refers to the identifier of the filter, I refers to a sub-tensor identified by i and j, w refers to a sub-filter identified by j and k, A refers to a summation indexed by i and k (e.g., the activation that will be placed at position i in the 2-D feature map in channel k of the output tensor).

In some embodiments, the parallel convolution processing may start with dividing the B summations into a plurality of groups with each group comprising (generating) m summations. In order to generate m summations, m rounds of parallel processing may be performed. During each round of parallel processing, m PEs are used to compute m partial sums in parallel according to an assignment of m sub-tensors and m sub-filters to the m PEs. During two consecutive rounds of parallel processing, the m sub-filters may be rotated among the PEs.

The diagram in FIG. 8B illustrates the multiple (m) rounds of parallel processing for one of the plurality of groups of summations. During the first round (t=1), each of the m PEs is assigned one sub-tensor and one sub-filter from one channel group, but different PEs handle different channel groups (i.e., no two PEs handle the same channel group). As shown, when t=1, PE1 handles the first channel group ($I_{1,1}$ and $W_{1,k}$ are from channel group 1), and PE 2 handles the second channel group ($I_{2,2}$ and $W_{2,k}$ are from channel group 2). Furthermore, different PEs handle sub-tensors from different positions of a 2-D feature map of the input tensor, (i.e., no two PEs handle the sub-tensors from the same position on the 2-D feature map). As shown, when t=1, PE1 handles $I_{1,1}$ at position 1 on the 2-D feature map, and PE2 handles $I_{2,2}$ at position 2 on the 2-D feature map.

During the second round (t=2), the assignment of the sub-filters is rotated among the m PEs. For example, $W_{2,k}$ is rotated from PE2 (during the first round) to PE1 (during the second round). Formally, $W_{i,k}$ assigned to PEi during the $i_{th}$ round is rotated to PEi−1 during the $i+1_{th}$ round. For the following rounds (t=3, m), the weights are rotated in the same direction. It may be noted that the sub-filter assigned to the first PE is rotated to the last PE.

After each round of the parallel processing, each PE may yield a partial sum by performing MAC operations on the assigned sub-tensor and sub-filter. During the m rounds of parallel processing, the m partial sums generated by each PE may be accumulated to eventually generate a dot product (i.e., a summation to be assembled into an output tensor) after the m rounds are complete. As shown in FIG. 8B, the summation $A_{1,k}$ may be collected after PE1 accumulates the partial sums it generated during each round of parallel processing.

Figure 9:
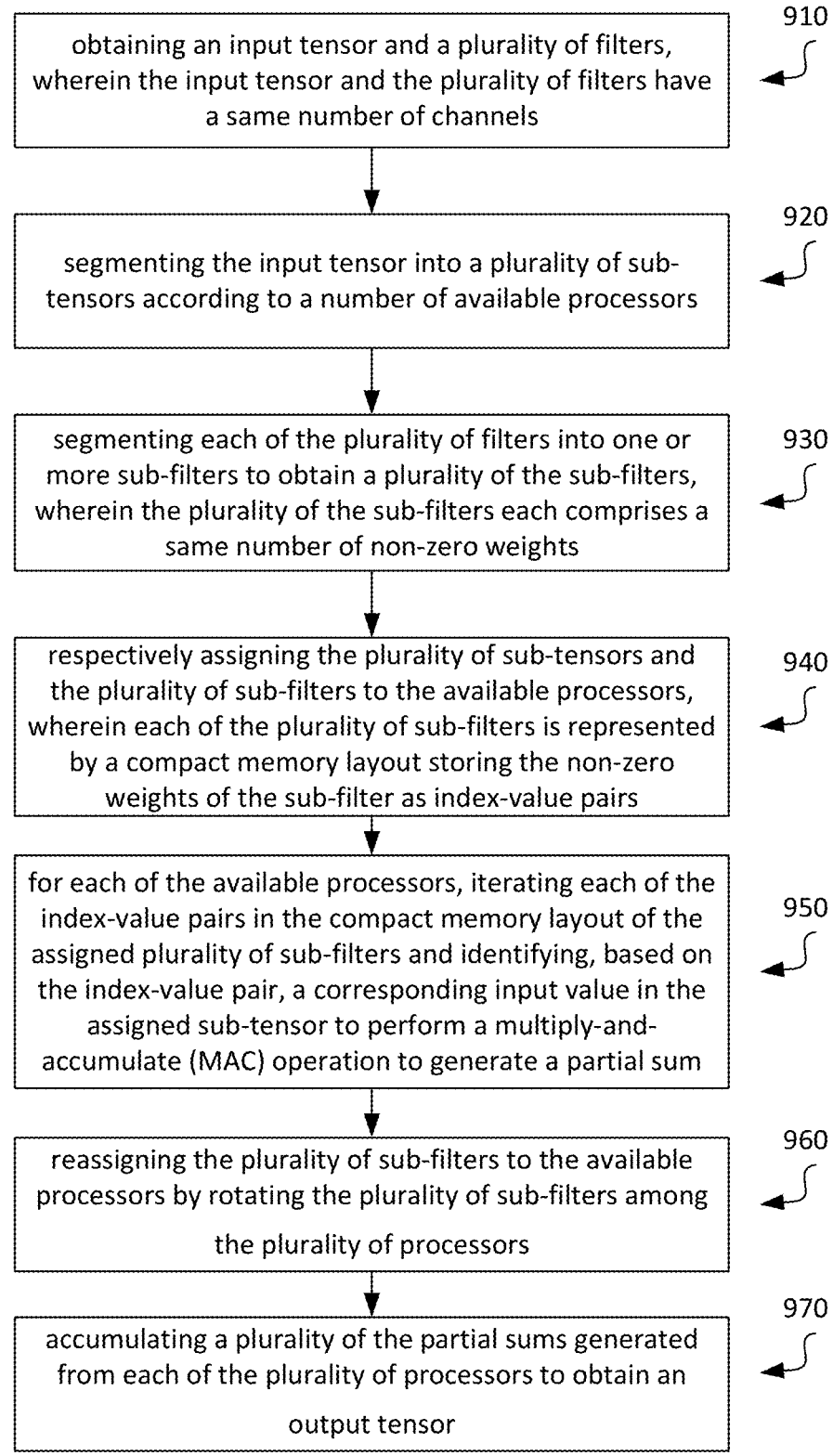
FIG. 9 illustrates an example method for balanced-weight convolution processing in accordance with various embodiments.

FIG. 9 illustrates an example method for balanced-weight convolution processing in accordance with various embodiments. The method 900 may be performed by a device, apparatus, or system for optimizing resource allocation. The method 900 may be performed by one or more modules/components of the environment or system illustrated by FIGS. 1-8, such as the hardware accelerator 500 and the processing entity (PE) 580 in FIG. 5. The operations of the method 900 presented below are intended to be illustrative. Depending on the implementation, the method 900 may include additional, fewer, or alternative steps performed in various orders or in parallel.

Block 910 includes obtaining an input tensor and a plurality of filters, wherein the input tensor and the plurality of filters have a same number of channels.

Block 920 includes segmenting the input tensor into a plurality of sub-tensors according to a number of available processors. In some embodiments, each of the plurality of sub-tensors comprises the same number of channels as the input tensor.

Block 930 includes segmenting each of the plurality of filters into one or more sub-filters to obtain a plurality of the sub-filters, wherein the plurality of the sub-filters each comprises a same number of non-zero weights. In some embodiments, each of the plurality of filters comprises a channel dimension, a height dimension, and a width dimension, and the segmenting each of the plurality of filters into one or more sub-filters comprises: dividing the channel dimension into a plurality of channel groups; and segmenting, according to the plurality of channel groups, the filter into a plurality of sub-filters with each corresponding to one of the plurality of channel groups. In some embodiments, the segmenting the filter into a plurality of sub-filters according to the channel groups comprises: segmenting the filter into a plurality of chunks according to the plurality of channel groups; and segmenting each of the plurality of chunks along the height dimension to obtain the plurality of sub-filters, wherein each of plurality of sub-filters shares the width dimension with the filter.

Block 940 includes respectively assigning the plurality of sub-tensors and the plurality of sub-filters to the available processors, wherein each of the plurality of sub-filters is represented by a compact memory layout storing the non-zero weights of the sub-filter as index-value pairs. In some embodiments, each of the index-value pairs comprises a channel-dimension index, a width-dimension index, and a corresponding non-zero weight. In some embodiments, a subset of the plurality of sub-tensors from a same horizontal plane of the input tensor are respectively assigned to a subset of the available processors, and the assigning the plurality of sub-filters to the available processors comprises: identifying a subset of the plurality of sub-filters that are from a same filter but correspond to different channel groups; and respectively assigning the subset of the plurality of sub-filters to the subset of the available processors.

Block 950 includes for each of the available processors, iterating each of the index-value pairs in the compact memory layout of the assigned plurality of sub-filters and identifying, based on the index-value pair, a corresponding input value in the assigned sub-tensor to perform a multiply-and-accumulate (MAC) operation to generate a partial sum. In some embodiments, the identifying, based on the index-value pair, a corresponding input value in the assigned sub-tensor to perform a MAC operation to generate a partial sum comprises: identifying an input value in the assigned sub-tensor based on the channel dimension index and the width-dimension index in the index-value pair; performing a multiplication operation based on the identified input value and the corresponding non-zero weight in the index-value pair to obtain a dot product; and accumulating the dot product with a corresponding partial sum to obtained a new partial sum. In some embodiments, the partial sum generated by performing the MAC operation is stored in an accumulation buffer of the processor that is accessible by neighboring processors.

Block 960 includes reassigning the plurality of sub-filters to the available processors by rotating the plurality of sub-filters among the plurality of processors. In some embodiments, the rotating the plurality of sub-filters among the plurality of processors comprises: reassigning the plurality of sub-filters to the available processors by rotating a sub-filter that was assigned to an i-th processor to an (i+1)-th processor.

Block 970 includes accumulating a plurality of the partial sums generated from each of the plurality of processors to obtain an output tensor. In some embodiments, the accumulating the plurality of the partial sums generated from each of the plurality of processors to obtain an output tensor comprises: during a current convolution layer of a neural network, accumulating the plurality of the partial sums generated from each of the plurality of processors to obtain an activation sub-tensor; in response to the current layer not being a last convolution layer, storing the activation sub-tensor in the processor for a next convolution layer of the neural network; and in response to the current being the last convolution layer, aggregating a plurality of the activation sub-tensors from the available processors to obtain the output tensor.

In some embodiments, the method 900 may further comprise: pruning each of the plurality of filters so that every a predetermined number of channels of the filter comprise the same number of non-zero values.

Figure 10:
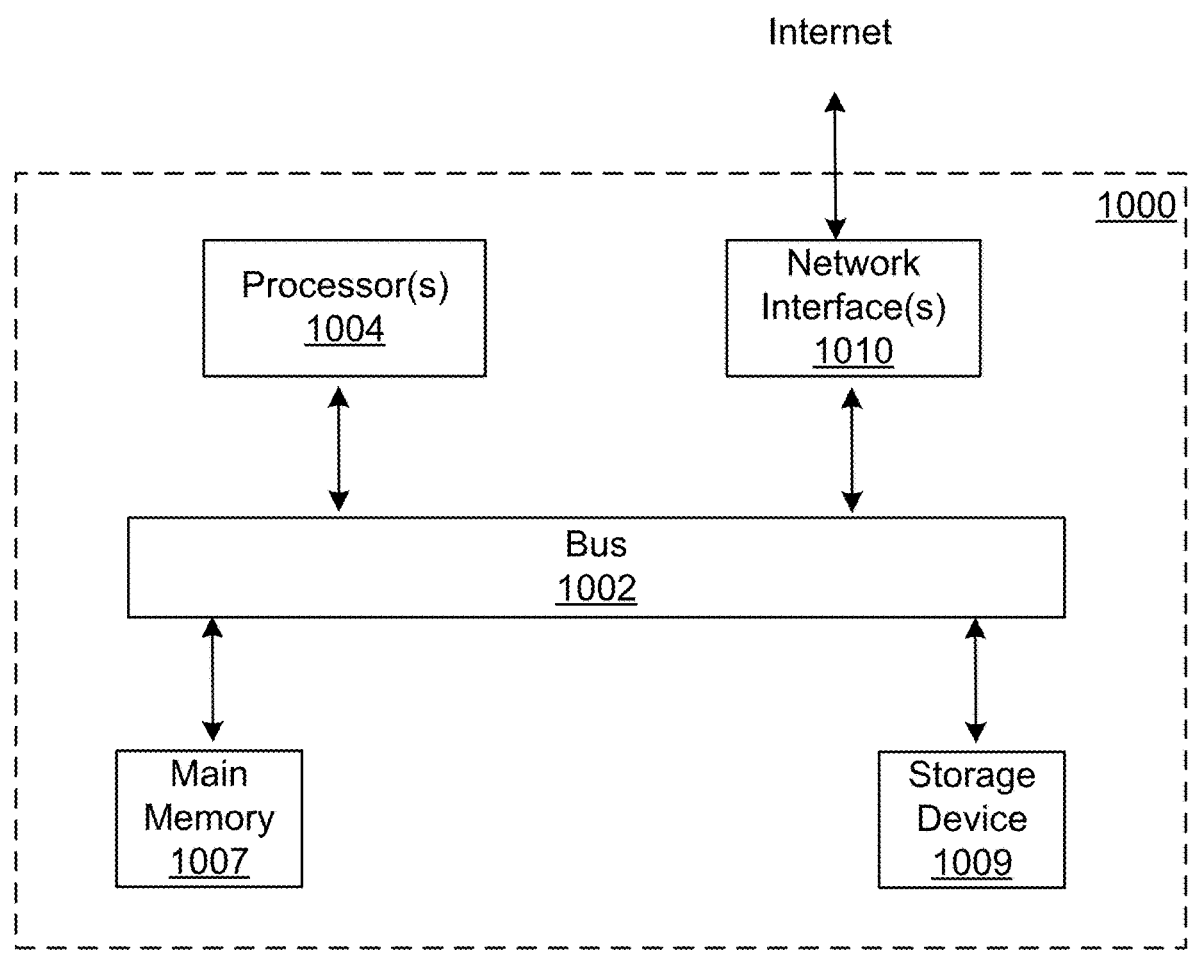
FIG. 10 illustrates an example computer system in which any of the embodiments described herein may be implemented.

FIG. 10 illustrates an example computing device in which any of the embodiments described herein may be implemented. The computing device may be used to implement one or more components of the systems and the methods shown in FIGS. 1-9. The computing device 1000 may comprise a bus 1002 or other communication mechanisms for communicating information and one or more hardware processors 1004 coupled with bus 1002 for processing information. Hardware processor(s) 1004 may be, for example, one or more general purpose microprocessors.

The computing device 1000 may also include a main memory 1007, such as a random-access memory (RAM), cache and/or other dynamic storage devices, coupled to bus 1002 for storing information and instructions to be executed by processor(s) 1004. Main memory 1007 also may be used for storing temporary variables or other intermediate information during execution of instructions to be executed by processor(s) 1004. Such instructions, when stored in storage media accessible to processor(s) 1004, may render computing device 1000 into a special-purpose machine that is customized to perform the operations specified in the instructions. Main memory 1007 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 1000 may implement the techniques described herein using customized hard-wired logic, one or more ASICs or FPGAs, firmware and/or program logic which in combination with the computing device may cause or program computing device 1000 to be a special-purpose machine. According to one embodiment, the techniques herein are performed by computing device 1000 in response to processor(s) 1004 executing one or more sequences of one or more instructions contained in main memory 1007. Such instructions may be read into main memory 1007 from another storage medium, such as storage device 1009. Execution of the sequences of instructions contained in main memory 1007 may cause processor(s) 1004 to perform the process steps described herein. For example, the processes/methods disclosed herein may be implemented by computer program instructions stored in main memory 1007. When these instructions are executed by processor(s) 1004, they may perform the steps as shown in corresponding figures and described above. In alternative embodiments, hard-wired circuitry may be used in place of or in combination with software instructions.

The computing device 1000 also includes a communication interface 1010 coupled to bus 1002. Communication interface 1010 may provide a two-way data communication coupling to one or more network links that are connected to one or more networks. As another example, communication interface 1010 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer-readable storage medium. Particular technical solutions disclosed herein (in whole or in part) or aspects that contributes to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A computer-implemented method, comprising:
   obtaining an input tensor and a plurality of filters at a layer within a neural network;
   segmenting the input tensor into a plurality of sub-tensors;
   for each of the plurality of filters, pruning the filter, wherein the pruning comprises:
      dividing a channel dimension of the filter into a plurality of channel groups, each channel group comprising a same number of two or more continuous channels of the filter, and
      pruning the filter so that (1) each channel group within the filter comprises a same number of one or more non-zero weights, and (2) all non-zero weights in the filter are evenly distributed in the plurality of channel groups within the filter, wherein the pruning comprises setting one or more non-zero weights to zeros;
   storing the non-zero weights in each of the plurality of channel groups of each filter as index-value pairs;
   segmenting, according to the plurality of pruned channel groups, each of the plurality of filters into a plurality of sub-filters, wherein each of the plurality of sub-filters comprises the same number of non-zero weights and the corresponding index-value pair consumes a same number of bits; and
   assigning the plurality of sub-tensors and the plurality of sub-filters to a plurality of processors for parallel convolution processing.

2. The method of claim 1, wherein the method further comprises performing the parallel convolution processing by:
   iterating, by each of the plurality of processors, each non-zero weight of a sub-filter assigned to the processor; and
   identifying, by the processor, a corresponding input value in a sub-tensor assigned to the processor to perform a multiply-and-accumulate (MAC) operation.

3. The method of claim 1, wherein the method further comprises performing the parallel convolution processing by:
   for each of the non-zero weights stored as an index-value pair, identifying a corresponding input value in an assigned sub-tensor at a location identified by the channel-dimension index and the width-dimension index of the index-value pair representing each non-zero weight.

4. The method of claim 1, further comprising:
   rotating the plurality of sub-filters among the plurality of processors.

5. The method of claim 1, wherein segmenting each of the plurality of filters into the plurality of sub-filters according to the plurality of pruned channel groups comprises:
   segmenting the filter into a plurality of chunks according to the plurality of pruned channel groups; and
   segmenting each of the plurality of chunks into a plurality of horizontal planes.

6. The method of claim 5, further comprising:
   pruning the plurality of horizontal planes so that each of the plurality of horizontal planes comprises the same number of non-zero weights.

7. The method of claim 1, wherein after the parallel convolution processing, the plurality of processors generate a plurality of partial sums, and
   the method further comprises:
   accumulating the plurality of partial sums to obtain an output tensor; and
   feeding the output tensor as an input tensor for a next layer of the neural network.

8. A system, comprising:
   a plurality of processors; and
   one or more non-transitory computer-readable memories coupled to the plurality of processors and configured with instructions executable by the plurality of processors to cause the system to perform operations comprising:
   obtaining an input tensor and a plurality of filters at a layer within a neural network;
   segmenting the input tensor into a plurality of sub-tensors;
   for each of the plurality of filters, pruning the filter, wherein the pruning comprises:

dividing a channel dimension of the filter into a plurality of channel groups, each channel group comprising a same number of two or more continuous channels of the filter, and pruning the filter so that (1) each channel group within the filter comprises a same number of one or more non-zero weights, and (2) all non-zero weights in the filter are evenly distributed in the plurality of channel groups within the filter, wherein the pruning comprises setting one or more non-zero weights to zeros;

storing the non-zero weights in each of the plurality of channel groups of each filter as index-value pairs;

segmenting, according to the plurality of pruned channel groups, each of the plurality of filters into a plurality of sub-filters, wherein each of the plurality of sub-filters comprises the same number of non-zero weights and the corresponding index-value pair consumes a same number of bits; and assigning the plurality of sub-tensors and the plurality of sub-filters to a plurality of processors for parallel convolution processing.

9. The system of claim 8, wherein the operations further comprise performing the parallel convolution processing by:
iterating, by each of the plurality of processors, each non-zero weight of a sub-filter assigned to the processor; and
identifying, by the processor, a corresponding input value in a sub-tensor assigned to the processor to perform a multiply-and-accumulate (MAC) operation.

10. The system of claim 8, wherein the operations further comprise performing the parallel convolution processing by:
for each of the non-zero weights stored as an index-value pair, identifying a corresponding input value in an assigned sub-tensor at a location identified by the channel-dimension index and the width-dimension index of the index-value pair representing each non-zero weight.

11. The system of claim 8, wherein the segmenting each of the plurality of filters into the plurality of sub-filters according to the plurality of pruned channel groups comprises:
segmenting the filter into a plurality of chunks according to the plurality of pruned channel groups; and
segmenting each of the plurality of chunks into a plurality of horizontal planes.

12. The system of claim 11, wherein the operations further comprise:
pruning the plurality of horizontal planes so that each of the plurality of horizontal planes comprises the same number of non-zero weights.

13. The system of claim 8, wherein after the parallel convolution processing, the plurality of processors generate a plurality of partial sums, and
the operations further comprise:
accumulating the plurality of partial sums to obtain an output tensor; and feeding the output tensor as an input tensor for a next layer of the neural network.

14. A non-transitory computer-readable storage medium configured with instructions executable by a plurality of processors to cause the plurality of processors to perform operations comprising:
obtaining an input tensor and a plurality of filters at a layer within a neural network;
segmenting the input tensor into a plurality of sub-tensors;
for each of the plurality of filters, pruning the filter, wherein the pruning comprises:
dividing a channel dimension of the filter into a plurality of channel groups, each channel group comprising a same number of two or more continuous channels of the filter, and
pruning the filter so that (1) each channel group within the filter comprises a same number of one or more non-zero weights, and (2) all non-zero weights in the filter are evenly distributed in the plurality of channel groups within the filter, wherein the pruning comprises setting one or more non-zero weights to zeros;
storing the non-zero weights in each of the plurality of channel groups of each filter as index-value pairs;
segmenting, according to the plurality of pruned channel groups, each of the plurality of filters into a plurality of sub-filters, wherein each of the plurality of sub-filters comprises the same number of non-zero weights and the corresponding index-value pair consumes a same number of bits; and
assigning the plurality of sub-tensors and the plurality of sub-filters to a plurality of processors for parallel convolution processing.

15. The non-transitory computer-readable storage medium of claim 14, wherein the operations further comprise performing the parallel convolution processing by:
iterating, by each of the plurality of processors, each non-zero weight of a sub-filter assigned to the processor; and
identifying, by the processor, a corresponding input value in a sub-tensor assigned to the processor to perform a multiply-and-accumulate (MAC) operation.

16. The non-transitory computer-readable storage medium of claim 14, wherein the segmenting each of the plurality of filters into the plurality of sub-filters according to the plurality of pruned channel groups comprises:
segmenting the filter into a plurality of chunks according to the plurality of pruned channel groups; and
segmenting each of the plurality of chunks into a plurality of horizontal planes.

17. The non-transitory computer-readable storage medium of claim 16, wherein the operations further comprise:
pruning the plurality of horizontal planes so that each of the plurality of horizontal planes comprises the same number of non-zero weights.

* * * * *